US009373105B2

(12) United States Patent
Heit et al.

(10) Patent No.: US 9,373,105 B2
(45) Date of Patent: *Jun. 21, 2016

(54) METHOD AND SYSTEM FOR THIN CLIENT BASED IMAGE AND TRANSACTION MANAGEMENT

(71) Applicant: RDM Corporation, Waterloo (CA)

(72) Inventors: Graham Heit, Waterloo (CA); Douglas Newman, Elora (CA); Dima Shamroni, Waterloo (CA); Dhammika Botejue, Waterloo (CA); John Kavanagh, Kitchener (CA)

(73) Assignee: RDM Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/023,905

(22) Filed: Sep. 11, 2013

(65) Prior Publication Data

US 2014/0195438 A1    Jul. 10, 2014

Related U.S. Application Data

(63) Continuation of application No. 12/474,350, filed on May 29, 2009, now Pat. No. 8,566,186, which is a continuation of application No. 11/797,733, filed on May 7, 2007, now Pat. No. 7,577,611.

(60) Provisional application No. 60/797,752, filed on May 5, 2006.

(51) Int. Cl.
| | |
|---|---|
| *G06Q 40/00* | (2012.01) |
| *G06Q 20/04* | (2012.01) |
| *G06Q 10/10* | (2012.01) |
| *G06Q 20/10* | (2012.01) |

(52) U.S. Cl.
CPC ............. *G06Q 20/042* (2013.01); *G06Q 10/10* (2013.01); *G06Q 20/108* (2013.01); *G06Q 40/12* (2013.12)

(58) Field of Classification Search
CPC ....... G06Q 40/00; G06Q 10/00; G06Q 20/00; G06Q 30/00
USPC ................................. 705/3–44; 382/131–139
See application file for complete search history.

(56) References Cited

U.S. PATENT DOCUMENTS

| | | | | | |
|---|---|---|---|---|---|
| 5,134,669 | A | * | 7/1992 | Keogh et al. ................... | 382/318 |
| 5,826,244 | A | * | 10/1998 | Huberman ....................... | 705/37 |
| 6,324,353 | B1 | * | 11/2001 | Laussermair et al. ........... | 399/16 |
| 6,697,512 | B2 | * | 2/2004 | Simonoff ....................... | 382/139 |
| 6,728,397 | B2 | * | 4/2004 | McNeal ........................ | 382/137 |
| 6,991,158 | B2 | * | 1/2006 | Munte ........................... | 235/379 |
| 7,386,511 | B2 | * | 6/2008 | Buchanan et al. .............. | 705/45 |
| 2012/0166342 | A1 | * | 6/2012 | Reid et al. ....................... | 705/45 |

* cited by examiner

*Primary Examiner* — Frantzy Poinvil
(74) *Attorney, Agent, or Firm* — Grant Tisdall; Gowling WLG (Canada) LLP

(57) ABSTRACT

Provided is a system for coordinating collection and processing of digital data by a plurality of deposit modules with respect to a plurality of users over a communications network, the digital data based on a plurality of original paper deposits and including at least digital images of the original paper deposits and respective deposit information, the system comprising: a communications module that provides a list of one or more deposit functions assigned to each respective user, each of the deposit functions coordinated by a corresponding module of the plurality of deposit modules, and that provides a list of the respective digital data that is associated with each of the assigned deposit modules; the plurality of deposit modules that facilitates a distribution of the deposit functions for the collection and processing of the digital data with one or more users of the plurality of users.

46 Claims, 18 Drawing Sheets

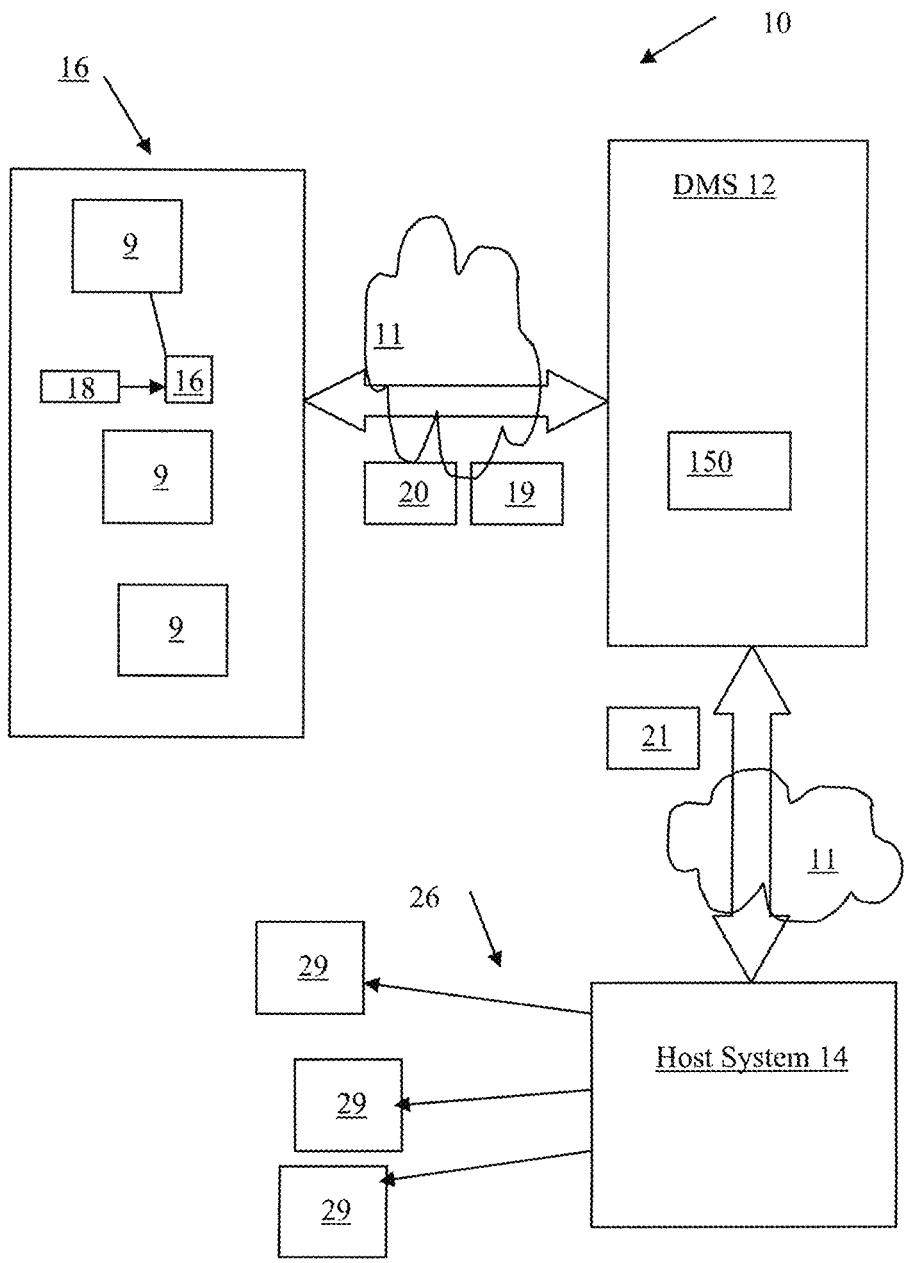

| Settlement paths/endpoints 28 | Terminology | Explanation |
|---|---|---|
| Stop | Stop | Item cannot be processed by ITMS or by the bank. ¹Note environment 50 to be configured for ITMS Client side "Stop" processing. |
| Paper Deposit | Original Paper Deposit (OPD) | Original paper check must be deposited at the bank. |
| IRD | Reproduced Paper (RP) | Item will be processed as an IRD (Image Replacement Document). |
| ACH | Automated Clearing House | Item can be processed through ACH member 29 network |

Figure 12a

| ITMS DDP Filter Types | Description / Function |
|---|---|
| Stops | Biller Stops: Can be configured to reject a particular checking account number or bank R/T number from being accepted by the ITMS system. |
| Rules | ACH Eligibility Rules: Can be configured to enforce current NACHA regulations on the attributes of transactions that can be processed through ACH system. Eligibility rules can be configured based on check dollar amounts, check type (i.e. corporate checks) and/or check number(s) for items that are not to be processed as ACH transactions. |
| Opt-Outs | Consumer Opt-Outs: Can be configured to identify a consumer account that has chosen not to have their check processed as an ACH transaction. Consumer accounts can be identified either by the Biller account number (secondary ID) or the bank R/T number and checking account number for the consumer. |
| Blocks | MICR Account Blocks: Can be configured to block particular checking account numbers or bank R/T numbers from being processed as ACH transactions. |
| ACHables | Bank ACHables: Can be configured to accept items from specific bank R/T numbers that are eligible for ACH processing. |

822        Figure 12b        824

| ITMS DDP Decisioning Filters | ITMS DDP Configurable Endpoint(s) | Explanation |
|---|---|---|
| Stops | Stop | Typically configured for ITMS Client side decisioning, the user will be prompted with a message stating that the check has been stopped for processing. Neither ITMS nor the bank can process stopped items. |
| Rules | OPD / RP | If configured for Client side decisioning, the user will be prompted to deposit the check at the bank (OPD). If configured for Host side decisioning, the user will not be prompted and the Host will route the item for IRD processing (RP). |
| Opt-Outs | OPD / RP | |
| Blocks | OPD / RP | |
| ACHables | OPD / RP | |

Figure 12c

| DDP Configuration 827 | DDP Decisioning Type 822 | Enabled (Y/N) 814 | Processing Location (Client / Host) 832 | Expected Endpoint (Paper Deposit, IRD, Stop, ACH) 28 | Typical User Message 828 |
|---|---|---|---|---|---|
| ACH Eligible / Paper Deposit Ineligible (Flowchart A) | Biller "Stops" | Y | Client | Stop | This check cannot be accepted. Please return to the Consumer. |
| | ACH Eligibility "Rules" | Y | Client | Original Paper Deposit (OPD) | Please deposit this check through normal channels at your Bank. |
| | Consumer "Opt-Outs" | Y | Client | Original Paper Deposit (OPD) | Please deposit this check through normal channels at your Bank. |
| | MICR "Blocks" | Y | Client | Original Paper Deposit (OPD) | Please deposit this check through normal channels at your Bank. |
| | Bank "ACHables" | Y | Client | Original Paper Deposit (OPD) | Please deposit this check through normal channels at your Bank. |
| ACH Eligible / IRD Ineligible (Flowchart B) | Biller "Stops" | Y | Client | Stop | This check cannot be accepted. Please return to the Consumer. |
| | ACH Eligibility "Rules" | Y | Host | IRD (RP) | N/A |
| | Consumer "Opt-Outs" | Y | Host | IRD (RP) | N/A |
| | MICR "Blocks" | Y | Host | IRD (RP) | N/A |
| | Bank "ACHables" | Y | Host | IRD (RP) | N/A |
| IRD All (Flowchart C) | Biller "Stops" | Y | Client | Stop | This check cannot be accepted. Please return to the Consumer. |
| | ACH Eligibility "Rules" | Y | Host | IRD (RP) | N/A |
| | Consumer "Opt-Outs" | N | N/A | N/A | N/A |
| | MICR "Blocks" | N | N/A | N/A | N/A |
| | Bank "ACHables" | N | N/A | N/A | N/A |

Figure 12d

METHOD AND SYSTEM FOR THIN CLIENT BASED IMAGE AND TRANSACTION MANAGEMENT

This application is a further Continuation Application of U.S. patent application Ser. No. 12/474,350 filed May 29, 2009, now U.S. Pat. No. 8,566,186 which is a continuation of U.S. patent application Ser. No. 11/797,733, filed May 7, 2007, now U.S. Pat. No. 7,577,611 which claims the benefit of U.S. Provisional Application No. 60/797,752, filed May 5, 2006, in its entirety herein incorporated by reference.

BACKGROUND

The current paper document-processing environment is heavily dependent upon paper processing, which can be inefficient. What is needed is a distributed electronic paper document capture, storage, and process system to alleviate or otherwise mitigate the dependence upon paper form of items such as personal and business checks, for example.

In the prior art, a "thick" client (or, at least, a "smart" client) is used to provide an image of a check and associated data (or a number of checks, as the case may be), which is recorded on the client (computer) and subsequently transmitted to the central processing system. However, this arrangement can have some disadvantages. Deployment of the thick client can require necessary data collection and data processing software to be installed onto the local client computer responsible for the collection of document data, which can be relatively time-consuming as well as administratively expensive.

Further, there can be security concerns. Under "Check 21", images of checks are, in general, usable in the same way that an originally executed check may be used. The security concerns regarding the current state of the art processing data collection and processing systems arise because it is conceivable that an unauthorized third party may access a significant amount of image data relating to checks, which has been collected/processed at a particular local computer, when the collected data is submitted to the central processing system.

A further problem in current systems is inherent in centralised processing of the items, where all decisioning of the items to result in selected settlement paths is carried out at a host system, thus providing for potential bottlenecks in item processing during peak volume periods, for example.

A further problem is in efficient management of the system when it includes a plurality of client systems (for uploading the items) and one of more respective host systems (for processing the items to assign a respective settlement path) in the environment of multiple customers of the system, all with their own settlement and item processing needs.

SUMMARY

There is a need for a method and a system for image and transaction management that overcomes or otherwise mitigates at least one of the disadvantages of the prior art.

One aspect provided is a system for coordinating collection and processing of digital data by a plurality of deposit modules with respect to a plurality of users over a communications network, the digital data based on a plurality of original paper deposits and including at least digital images of the original paper deposits and respective deposit information, the system comprising: a communications module that provides a list of one or more deposit functions assigned to each respective user, each of the deposit functions coordinated by a corresponding module of the plurality of deposit modules, and that provides a list of the respective digital data that is associated with each of the assigned deposit modules; the plurality of deposit modules that facilitates a distribution of the deposit functions for the collection and processing of the digital data with one or more users of the plurality of users, the deposit modules including a first module that monitors receipt of the digital images and respective deposit information of the digital data, the first module associated with a scanner function of the list of deposit functions, and including a second module for implementing on the digital data a second deposit function of the plurality of the deposit functions; and a workflow module that monitors a flow of the digital data between the first deposit module and the second deposit module based on a completion status of the digital data with respect to the first module.

A further aspect provided is a method for coordinating collection and processing of digital data by a plurality of deposit modules with respect to a plurality of users over a communications network, the digital data based on a plurality of original paper deposits and including at least digital images of the original paper deposits and respective deposit information, the method comprising the acts of: assigning a list of one or more deposit functions to each respective user, each of the deposit functions coordinated by a corresponding module of the plurality of deposit modules; assigning the respective digital data of the digital data that is associated with each of the assigned deposit modules; providing network access to the deposit functions for the collection and processing of the digital data with one or more users of the plurality of users, the deposit modules including a first module that monitors receipt of the digital images and respective deposit information of the digital data, the first module associated with a scanner function of the list of deposit functions, and including a second module for implementing on the digital data a second deposit function of the plurality of the deposit functions; and monitoring a flow of the digital data between the first deposit module and the second deposit module based on a completion status of the digital data with respect to the first module.

BRIEF DESCRIPTION OF THE DRAWINGS

These and other features will become more apparent in the following detailed description in which reference is made to the appended drawings by way of example only, wherein:

FIG. 1 is a block diagram of an electronic cheque data collection and processing network system;

FIG. 12a,b,c provide further embodiments of the processes of FIG. 6;

FIG. 12d shows a further embodiment of the decisioning process of FIG. 6 including an example of the distributed decisioning environment of FIG. 5.

DESCRIPTION

Network System 10

Figure 2A:
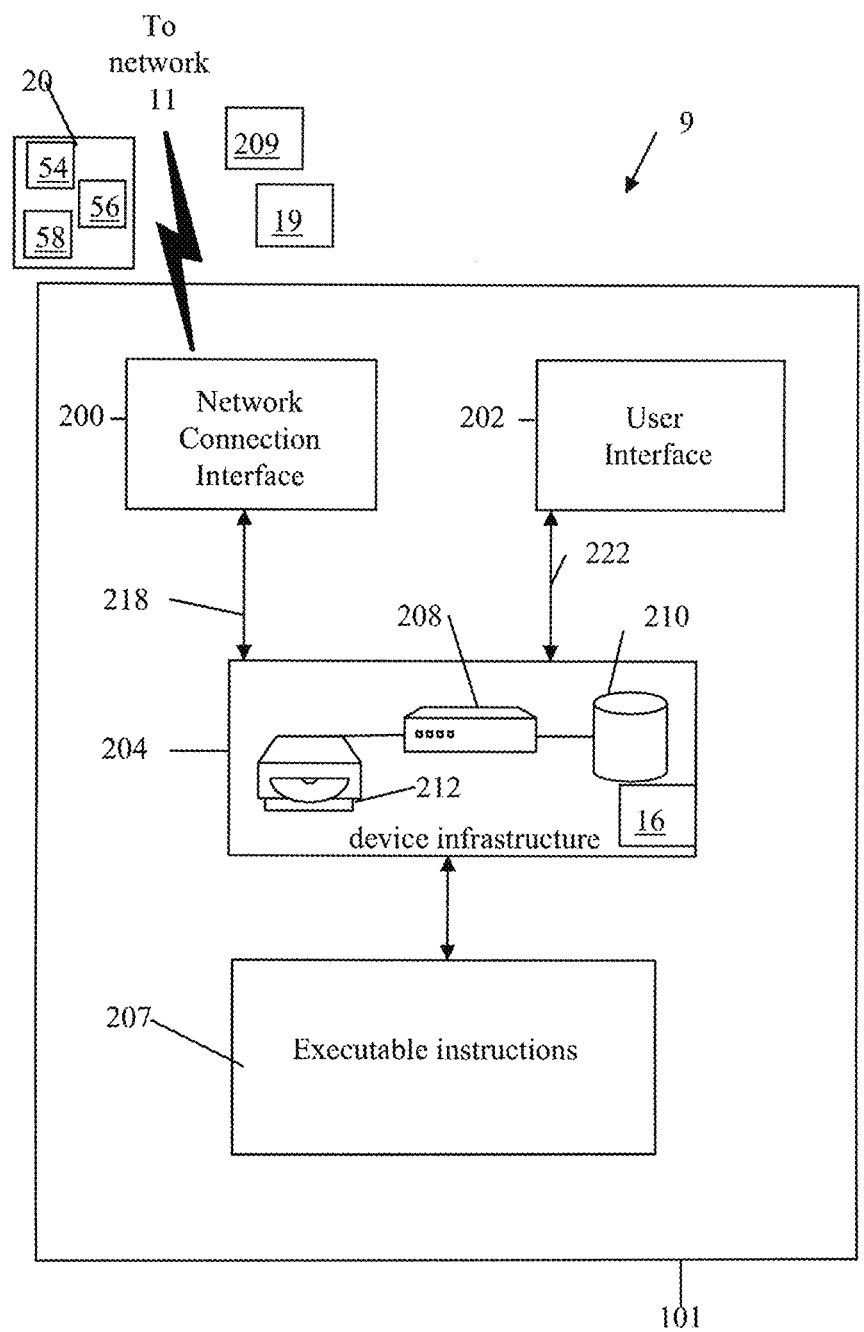
FIG. 2a is a block diagram of an computing device of a Deposit System of FIG. 1.

The below includes embodiments of a thin client-based image and transaction management system/method.

Referring to FIG. 1, network system 10 is shown having a plurality of distributed deposit systems (DSs) 9 coupled to one or more deposit management systems (DMSs) 12 over a communications network 11, such that the DSs 9 communicate image/data 20 associated with documents 18 to the DSMs 12. The DMSs 12 are in turn coupled with a host system 14 over the network 11 (e.g. Internet or other extranet/intranet), such as but not limited to using an ASP model implementation. The DSMs 12 communicate image/data 21, for example pre-processed image/data 20) to the host system 14 for subsequent settlement as transaction(s) 26. The network 11 can generally refer to one network or series of networks connecting the various network entities of the network system 10 to each other for communication purposes and image/data 20 and transaction 26 transfer, as further described below. The image/data 20 can include data such as but not limited to: image; payor; payee; document 18 date; bank account (check writer's) number; RTN (bank number); check serial number; routing number; document 18 amount; date of capture; capture site info (merchant ID); optional fields; transaction type (ARC vs. POP); image reference/item number; and batch ID. The image/data 20 can also include ACH (further divided into POP—person present and ARC—person not present), TEL (ACH debits over the telephone), WEB (e.g. Pay Pal™), RCK (second time cheque presentment), and others. In any event, the captured images and their associated MICR/OCR data (e.g. image/data 20) are communicated by the DSs 9 to the DMS(s) 12.

The network system 10 can provide for electronic payment processing, via various settlement options, i.e. transactions 26, for electronic check (e.g. one form of document 18) conversion systems including web-based image and transaction management services for banks, billers, retailers, payment processors and/or government agencies, hereafter generically referred to as members 29. At least some of the DSs 9 can use a scanner 16 (e.g. RDM EC5000x scanners) to convert a form of a check, coupon, or other document 18 (e.g. paper) to a digital representation image and associated data, hereafter referred to as image/data 20 files/packages/packets (or image/data 20 for short). The DSs 9 concerned can then send/upload the digital image/data 20 over the network 11 to the DMS 12 for eventual processing and decisioning/storage by the host system 14, as further described below. The image/data 20 source (e.g. DS 9) can be from a telephone order (TEL), such that the bank account and monetary amount is entered manually over the phone between the account holder and the telephone operator submitting the financial transaction. In this case of manual entry of the financial information, including the "check" information, the network system 10 is configured for final processing of this financial information by the host system 14, including for example reproduce paper as further described below. In this sense, the telephone order will also be considered to have an "image" component that is reproducible as a paper draft upon request from the host system 14 when stored in the database 22 (see FIG. 4).

As shown in FIG. 1, the DSs 9 are configured as a distributed deposit system assembly 16 (e.g. a collection or group of DSs 9) for processing the documents 18, such that one or more of the DSs 9 can contribute to the successful transmission of the image/data 20 to the DSM 12, which is suitable as completed image/data 21 for final decisioning and settlement by the host system 14 as the transactions 26, as further described below. The transaction 26 can be referred to as a grouping of one or more items (e.g. electronic representation of the physical document 18) representing a single consumer financial transaction. A batch can be referred to as a grouping of one or more transactions belonging to a single location/account/transaction type combination. A deposit can be referred to as a group of one or more batches uploaded to the host system 14 for processing/settlement. It is recognised that in batch processing, the procedure is that all of the documents 18 are scanned. As soon as the image/data 20 is captured for a particular document 18, then the review of that image/data 20 proceeds by the DMS 12. Thus, during batch mode processing, the images of the documents 18 can be reviewed in an asynchronous manner.

The DMS 12 can be a web-based system for providing distributed capture functionality of the image/data 20, as utilized by the DSs 9. Various deposit modules 150 (see FIG. 4), coordinated by the DMS 12, can be selected by the users of the DSs 9 upon entry into the DMS 12. The users of the DSs 9 can be referred to as a person who is registered in the host system 14 and/or DMS 12 and is provided access credentials to at least some of the modules 150 and at least some or all of their available deposit processing functionality. Each of the modules 150 provides a subset of the overall DMS 12 distributed deposit functionality, thereby performing one portion of the workflow (e.g. number of work units) of the distributed deposit process. The DSs 9 can be web/internet enabled computing devices 101 (see FIG. 2a) used by the user (e.g. DS 9 operator) to perform one or more functions (provided by the DMS 12) of distributed deposit process for the documents 18. The DS 9 may or may not have the scanner 16 attached to it (depending on function being performed).

The deposit modules 150 can be provided to the DSs 9 as a web service offered by the DSM 12, such that minimal network system 10 hardware/software, if any, is configured/installed on the DSs 9 to facilitate communication with the deposit modules 150. The deposit modules 150 are used to facilitate workflow partitioning of the deposit process of the documents 18 and can be modules 150 such as but not limited to: a scan items module 160 providing for scanning of documents 18 and, optionally, the entry of data associated with the documents 18; a key data module 165 providing for key entry of data associated with previously scanned items; an edit/balance batches module 170 providing for item amounts and batch totals to be adjusted to bring a batch into balance; and a review/approve module 175 providing for batches to be managed within the system 10 and to be candidates as image/data 21 for submission to the host system 14. For example, for the workflow through DMS 12 modules 150, the unit of work can be referred to as the "batch", i.e. collection of the image/data 20. For the purpose of deposit upload to the host system 14 (and the related acknowledgement), the unit of work can be referred to as the "deposit", i.e. the image/data 21.

It is recognised that in the case of the scan module 160, configuration software/hardware for the scanner 16 would be used by the DSs 9 to facilitate communication of respective image/data 20 to the DMS 12. Further, for the modules 150 in general, the transfer of the image/data 20 between the DSs 9 and the DMS(s) 12 is done using an agreed upon network communication protocol with image/data formatting. Accordingly, the coordinated operation of the modules 150, with respect to the image/data 20 obtained from one or more of the DSs 9, results in generation of the image/data 21 suitable for communication to the host system 14 for subsequent settlement and storage.

The DSM 12 is used to coordinate the collection of various image/data 20 associated with any particular document 18 (e.g. item) and/or group of documents 18 (e.g. batches), using the deposit workflow partitioning capabilities of the modules 150. For example, referring to FIGS. 1 and 2a, the image/data 20 can be subdivided in to file records 54 (e.g. a group of batches), batch records 56 (e.g. a group of items), and/or item records 58 (e.g. image/data on a document 18 by document 18 basis), depending upon the granularity of the network system 10 transmission and archiving configuration(s). For example, a file (e.g. image/data 20) can consist of 10000 cheque image/data entries, which is subdivided into 50 batches of 200 items each. Therefore, the acknowledgement and ultimate inclusion in the settlement process can be determined on the file/batch/item level as designed by the network system 10. The DSM 12 can process the image/data 20 into records 54, 56, 58 other than as received in the image/data 20. For example, the DSM 12 can collect initially scanned image/data 20 of documents 18 from a plurality of the DSs 9 (having scanners 16), and then combine or otherwise change the received plurality of image/data 20 into the image/data 21 (e.g. 3 batches collected/received as three different image/data 20 could be combined as a single batch stored as image/data 21). It is also recognised that the file record 54 can contain only one item record 58 (e.g. image/data 20 for a single document 18) or can contain one or more batch records 56 that each contain one or more item records 58.

Figure 7:
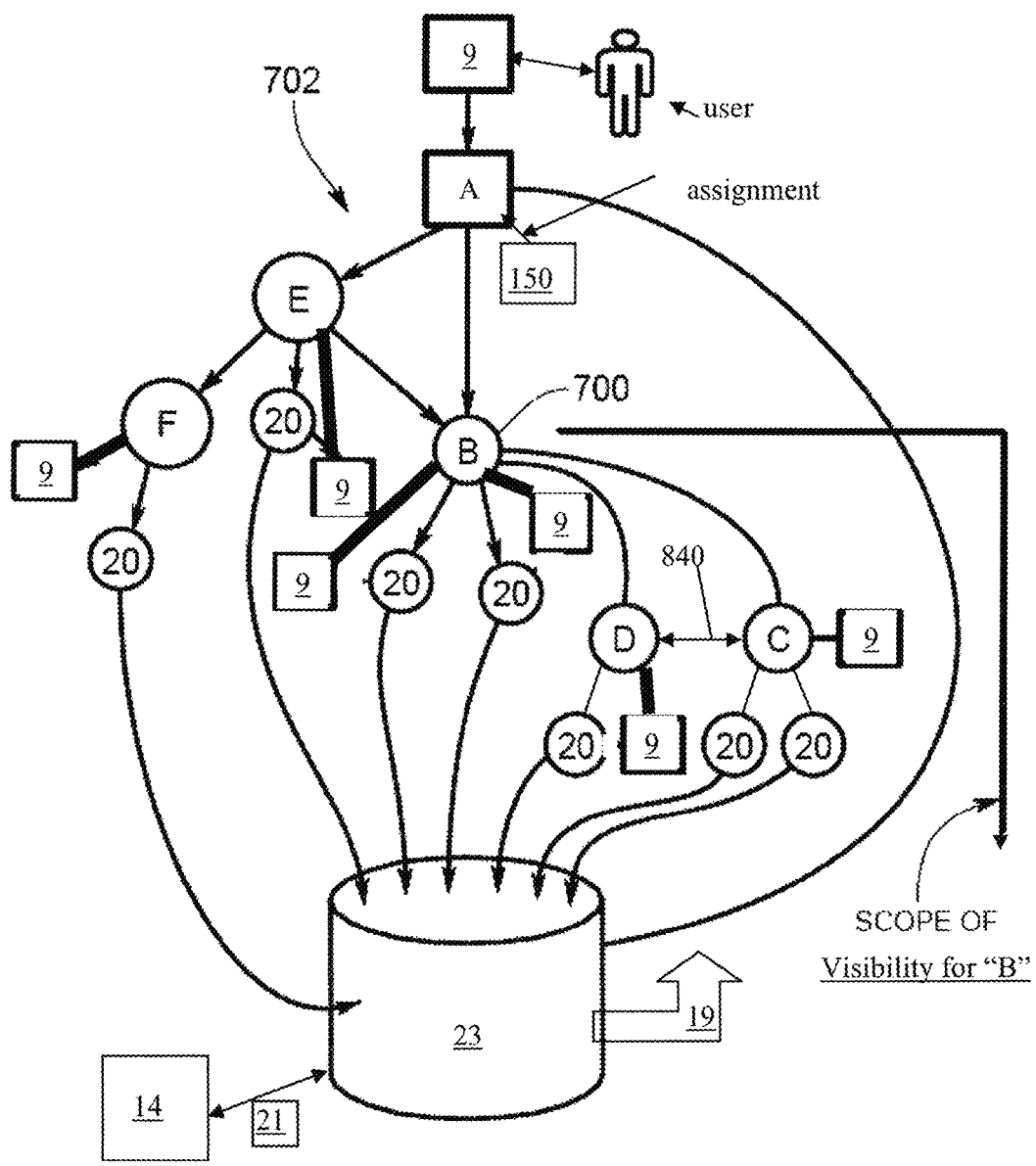
FIG. 7 shows a hierarchy of the system of FIG. 1.

Accordingly, in view of the above, it is recognised that each of the DSs 9 can contribute to total deposit information (i.e. image/data 21) transmitted to the host system 14 by the DSM 12, as coordinated through the workflow partitioning by the modules 150. As can be seen in FIGS. 1 and 7, the network system 10 can use a hierarchical structure 702 including a plurality of nodes 700. The structure 702 permits a user (not shown) of the DS 9 to log on at an assigned node 700 (or assigned nodes 700) in order to access the modules 150 associated with the assigned node(s) 700. The hierarchical structure 702 can be used by the DSM 12 to coordinate the collection of the image/data 20 from the various DSs 9, through a hierarchical assignment of roles/permissions with respect to access to the functionality of the modules 150, as further described below. The nodes 700 can be made accessible via the network 11 for DSs 9 at various geographic locations. Therefore, if the user has sign-on privileges with the DSM 12 and a network 11 connection to the DSM 12 is available, then the user of the DS 9 can access any node 700 (and therefore module(s) 150) for which the user is authorized. It is also recognised that the assignment of roles/permissions of the DS 9 users can be done on a user-by-user basis, therefore not using the hierarchical structure 702, as desired.

The network system 10 can be represented as an image management and transaction system (ITMS), web-based, that facilitates the electronic deposit and settlement of payments represented by the documents 18. The network system 10 is designed to accommodate one or many points of distributed payment collection, i.e. one to many DSs 9, via deposit workflow partitioning. The network system 10 can include four main components, the DSs 9, the DMS(s) 12, the host system 14, and the members 29. The DMS 12 and the host system 14 can be secure integrated networked components that work together to facilitate various methods of payment processing related to the documents 18. The network system 10 can provide support for Electronic Check Conversion (ECC) for point-of-purchase (POP) and accounts receivable (ARC) payment types as well as Check 21 initiatives. ARC is the process of converting a consumer check payment (e.g. image/data 20) for eligibility into an Automated Clearing House (ACH) debit transaction 26 in a lock box payment environment. ARC allows billers (e.g. DSs 9) to image the document 18 as a source document and convert the document 18 to an electronic ACH debit (including the image/data 20,21) for subsequent settlement by the host system 14. POP is a face-to-face transaction 26 whereby the document 18 is converted to an ACH eligible debit transaction 26 at the point-of-purchase and the cancelled document 18 is immediately returned to the customer.

Network 11 Communications

Referring to FIG. 1, the format of the image/data 20,21 transmission protocols/formats and acknowledgement formats (e.g. XML or other structured definition language defined protocols/formats), used in the network system 10, is defined for the network 11 communications between the DSs 9, the DMS 12 and the host system 14. The DS 9 can be configured to not store any transactional data or images in the local memory 210 (see FIG. 2a). Further, communication between the host system 14 and the DMS 12 and between the DMS 12 and the DSs 9 can be via secure https, for example. The DMS 12 can be represented as a deposit server in communication with a number of deposit clients, namely DSs 9, for coordinating via workflow partitioning of the image/data 20 captured by DSs 9 (e.g. a plurality of user-operated deposit client systems), hence a client-server relationship for communication of the image/data 20. Therefore, different users may run different modules 150 from different DSs 9 in different physical locations, e.g. ranging from across the room, to another building, to greater distances, thus providing the distributed deposit system assembly 16. For example, the DMS 12 can be a central deposit server for all electronically captured image/data 20 submitted from a number of user-operated clients DS 9 (e.g. in use by field agents or other users employed by the network system 10 to deposit the documents 18 electronically for eventual settlement by the host system 14).

Figure 4:
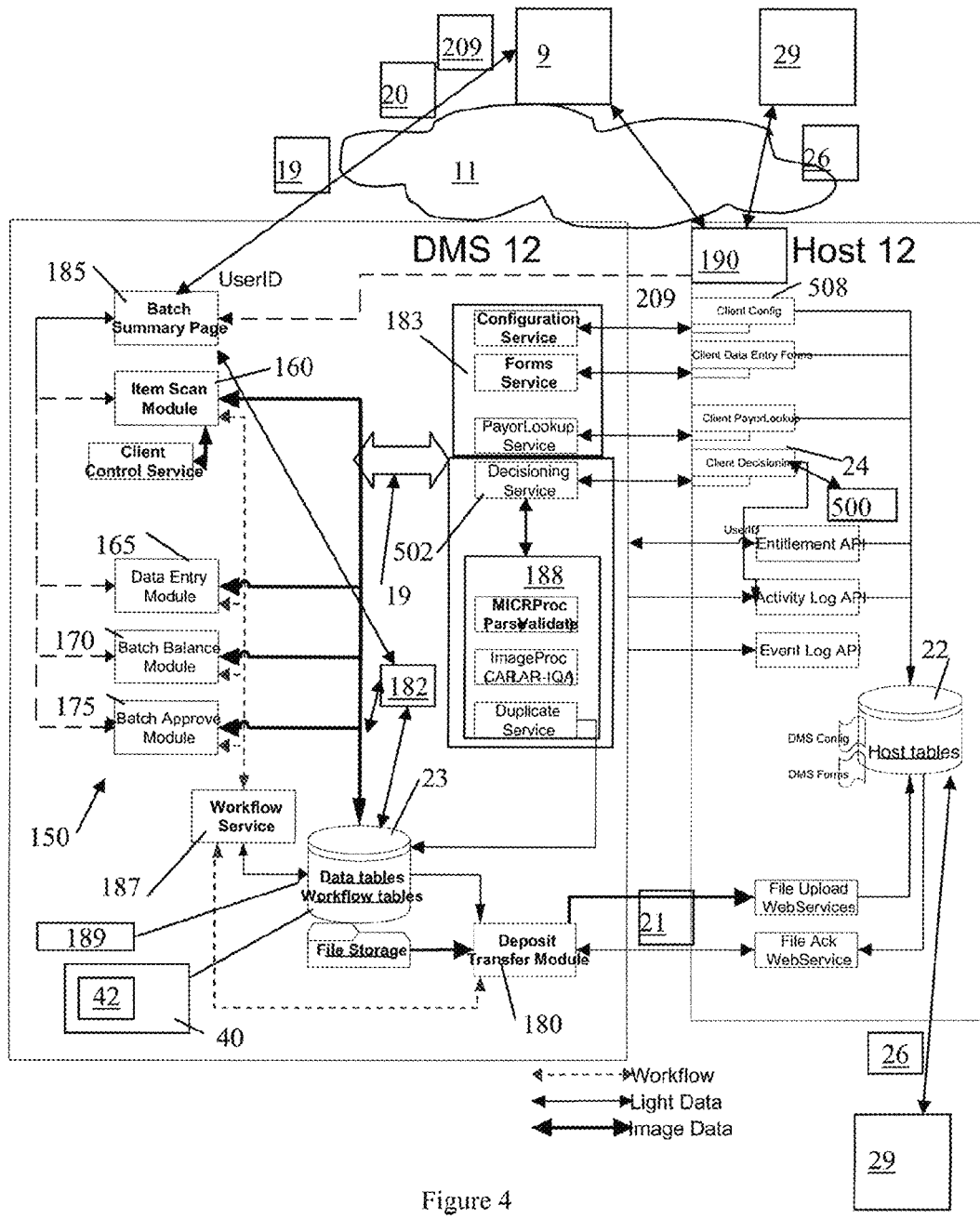
FIG. 4 is a block diagram of an example configuration of a host system and a DMS of FIG. 1.
Figure 8:
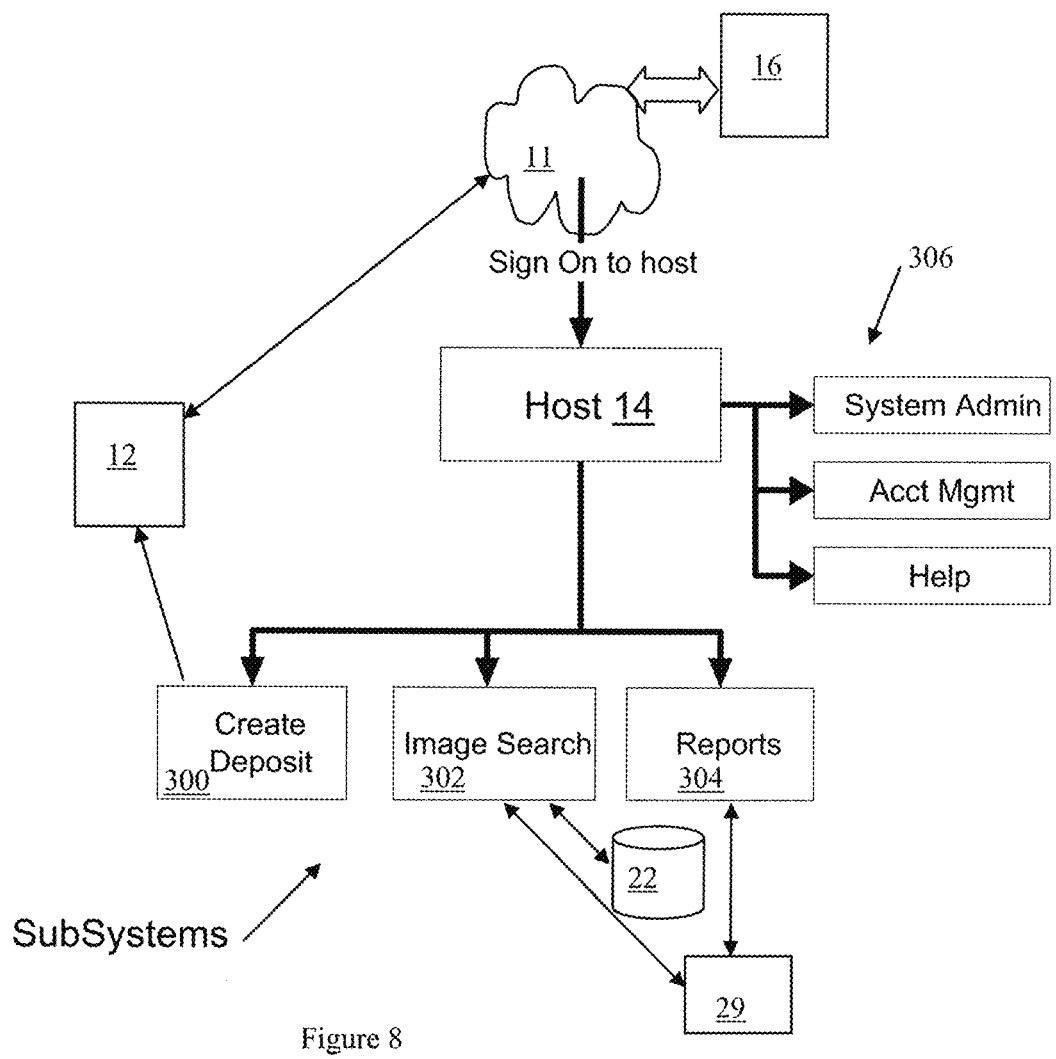
FIG. 8 is a further embodiment of the system of FIG. 1.

In a further embodiment, the host system 14 can be used as a network 11 portal by the DSs 9 for accessing the DMS(s) 12, as desired. For example, the DMS 12 is accessed as a subsystem 300 of a website provided by the host system 14. As shown in FIG. 8, to access the DMS(s) 12, the user of the DS 9 first goes to the host system 14 network 11 URL and signs in (e.g. provides user name and password), for example via a network browser 207 (e.g. included in the executable instructions 207 of the DS 9—see FIG. 2a). Preferably, once signed on, the user has access to the DMS 12 as the subsystem 300, as well as all the host system 14 functions provided independently of the DMS 12, functions such as but not limited to: searching 302 of the database 22; report request/generation 304; and administrative functions 306. To access the DMS 12, the user selects the subsystem 300 option presented in a menu—e.g., "create deposit" on the user interface 202 of the DS 9 (see FIG. 2a) by the DMS 12 and/or the host system 14. As shown in FIG. 4, the DMS 12 can have its own transactional data storage 23 independent of the host system 14. Once signed in, communication with the DS 9 can be handed off to the DMS 12 or can be brokered by the host system 14, as desired.

Referring to FIG. 1, the DMS(s) 12 can be represented as transaction client(s) in communication with a transaction server, namely the host system 14, hence a client-server relationship for communication of the image/data 21. Further, it is recognised that the host system 14 can be configured as a back-end system of the DMS(s) 12 and/or the DMS(s) 12 can be configured as a back-end system of the host system 14, as desired. In any event, it is recognised that the DMS(s) 12 are used in coordinating the collection of the image/data 20 from the DSs 9 using workflow partitioning, as further described below.

For example, it is recognised that the DMS 12 and the host system 14 can be configured as a web service(s) and/or other services such as but not limited to SQL Databases, IDL-based CORBA and RMI/IIOP systems, Legacy Databases, J2EE, SAP RFCs, and COM/DCOM components. The web service(s) can be defined as a software service, which can implement a network 11 communication interface such as expressed using Web Services Description Language (WSDL) registered in Universal Discovery Description and Integration (UDDI) in a web services registry, and can communicate through defined network 11 messaging by being exposed over the network 11 through an appropriate protocol, such as the Simple Object Access Protocol (SOAP). In some implementations, SOAP is a specification that defines the XML format for the network messaging, including a well-formed XML fragment enclosed in SOAP elements. SOAP also supports document style applications where the SOAP message is a wrapper around an XML document. A further optional part of SOAP defines the HTTP binding (i.e. header), whereas some SOAP implementations support MSMQ, MQ Series, SMTP, or TCP/IP transport protocols. Alternatively, the DSs 9, DMSs 12, and host system 14 may use other known communication protocols, message formats, and the interface may be expressed in other web services languages than described above. In view of the above, it is recognised that the functionality of the DMS 12, e.g. the modules 150 (see FIG. 4), can be represented to the DSs 9 as a web service.

Figure 9:
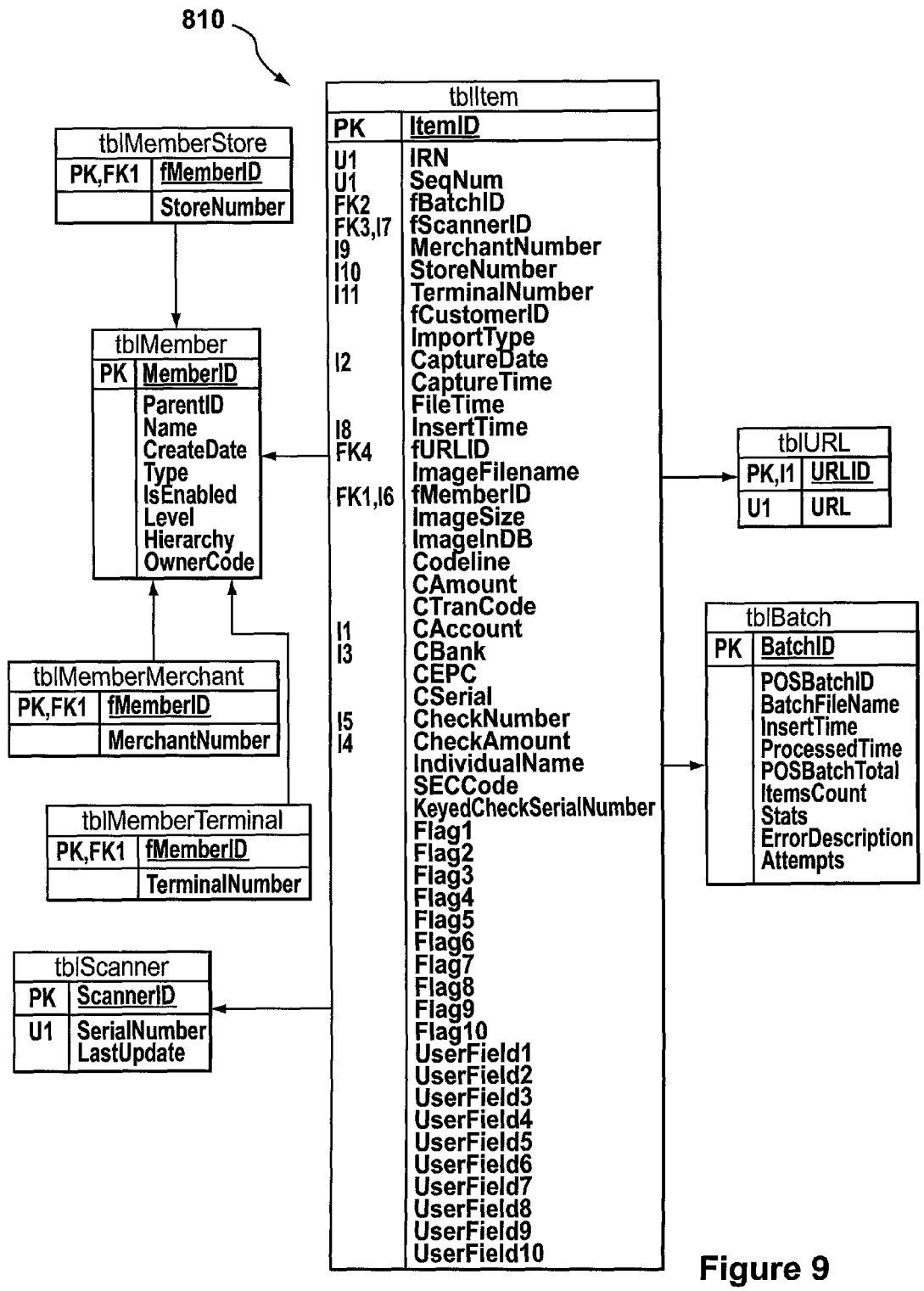
FIG. 9 is a block diagram of an example schema of the database of FIG. 4.

The image/data 20 file format (and associated features) supported by the network system 10 for indexing and storage can be such as but not limited to: Standard RDM TIFF (EC5000s and EC6000s); MIME-encoded TIFF (Client 12); MIME-encoded TIFF with Batch Summary; and TIFF with XML (MagTek and VeriFone Scanners). Further, referring to FIG. 9, an example portion 810 of a database 22,23 schema is shown.

In general, it is recognised that the network system 10 can include a plurality (not shown) of DMSs 12 such that each DMS 12 provides an entry point of the image/data 21 representing the image/data 20 of the DSs 9, for eventual acknowledgement and storage by the host system 14. It is also recognised that transfer of image/data 21 between the DMS 12 and the database 22 of the host system 14 can be done over the network 11 (Internet and/or intranet) as inter-device 101 communication, between the DMS 12 and the database 22 where both are hosted as part of the host system 14 on the same device 101 (e.g. as intra-device communication), or a combination thereof in the case where the network system 10 has multiple DMSs 12 distributed about the network system 10.

Host System 14

Figure 5:
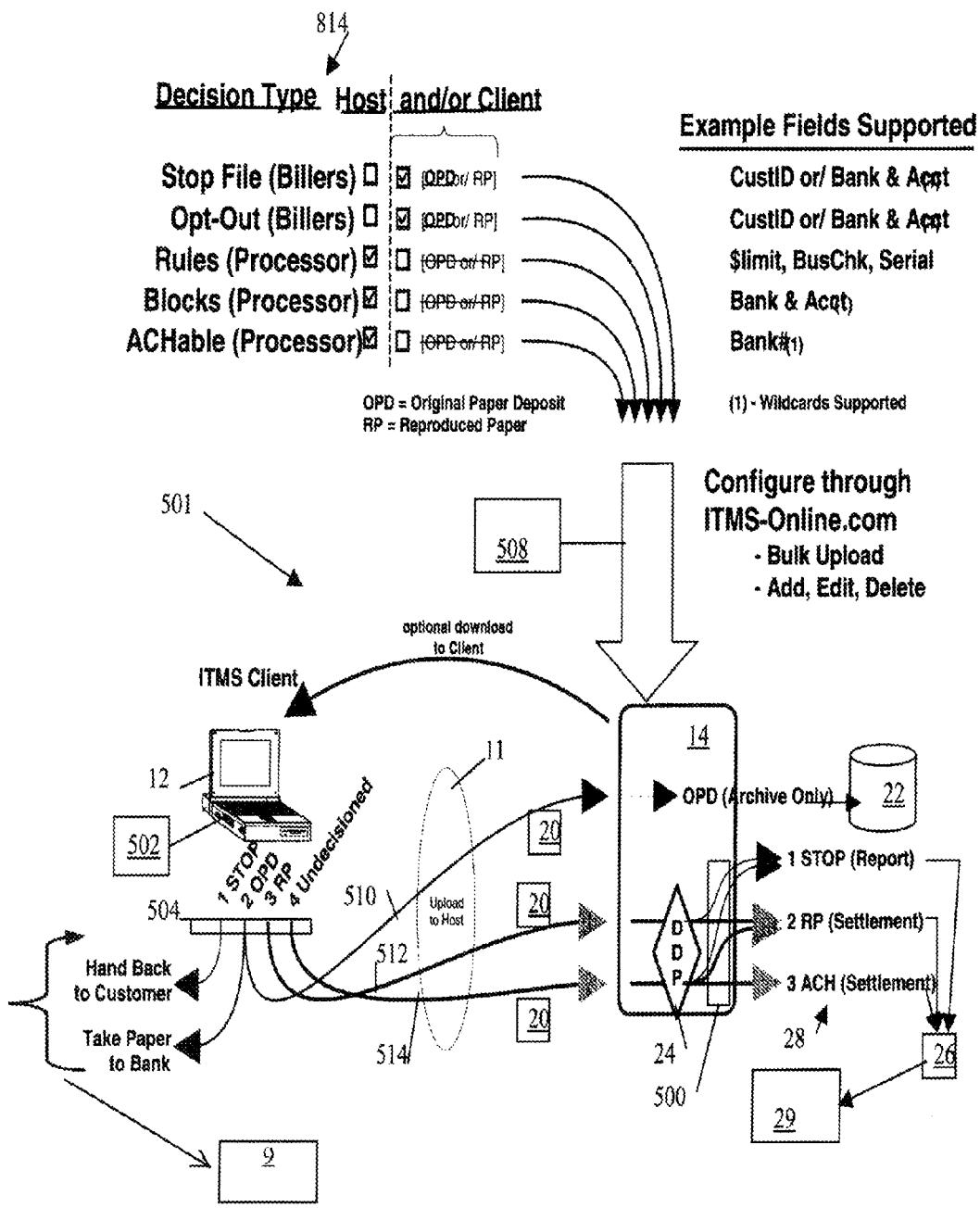
FIG. 5 is an example schematic showing details of a distributed decisioning environment of FIG. 4.
Figure 6:
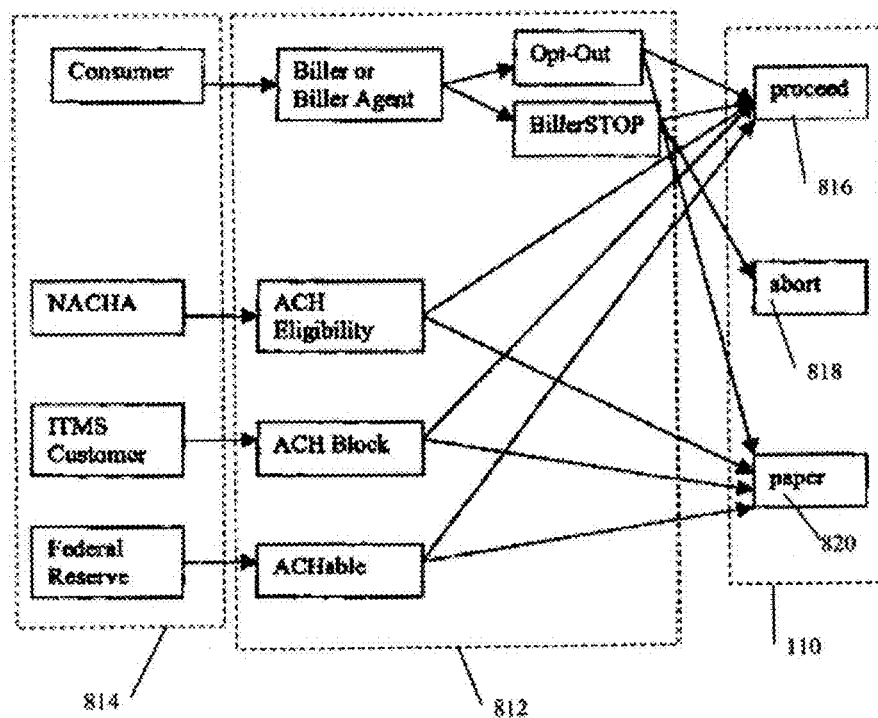
FIG. 6 shows a block diagram of an example decisioning process and a settlement process of the system of FIG. 1.

Referring to FIGS. 5 and 6, the Host system 14 has for example three primary functions: transaction 26 consolidation and routing, image/data 21 archiving, and administrative reporting of decisioning 812 and settlement 110 processes (see FIG. 6) as well as the status (including provisions for checks and balances—e.g. validation, acknowledgements, status, etc.) of the registered/stored image/data 21 in the database 22. The transaction consolidation function of host system 14 prepares and formats ACH transaction 26 files for delivery to any 3rd party ACH processor (e.g. member 29) for electronic financial settlement. The decisioning used by the decisioning process 812 can include such as but not limited to fiscal rules (e.g. less than a specified $ amount), OPTOUT—document 18 not okayed by document 18 issuer to be part of electronic processing, blocks—the document 18 type and/or issuer not accepted by a financial institution (e.g. member); stops—the document 18 type and/or issuer not accepted by payee; and ACH worthy/eligible.

Referring to FIGS. 4 and 5, the example host system 14 can have a web services module 190 for providing communication with the DS 9, the DMS 12, and the members 29. The host system 14 archives the image/data 21 received from the DMS 12 and determines the appropriate processing stream 28 for the transaction file 26 related to the documents 18 (e.g. coupon, check) represented by the original image/data 20, via a decisioning engine 24, based on a set of predefined decisioning criteria 500. The engine 24 decides the types of transactions 26 to accept based on the decisioning criteria 500, as well as decides which settlement path (i.e. transaction stream 28) to select. The host system 14 then communicates the transaction 26 to a back end transaction-processing destination, e.g. members 29, according to the selected processing stream 28. Examples of the transaction stream 28 can include ACH, Reproduce Paper, Stop, and Remittance. It is recognised that a portion of the functionality of the decisioning engine 24 can be handed over (e.g. a distributed decisioning environment 501) to the DMS 12 using a local decisioning engine 502, so as to provide for pre-decisioning of the image/data 20,21 before receipt by the host system 14. In this aspect, the decisioning function of the network system 10 can be shared or otherwise coordinated between the host system 14 and the DMS 12, in order to provide the distributed decisioning environment 501. It is recognised that the network system 10 can have a plurality of the DMSs 12 connected to the host system 14 and associated decision engine(s) 24, as desired. It is further recognised that all decisioning could be implemented by the host system 14, as desired. In this case, the role of the DMS 12 would be for coordination image/data 20 collections from the DSs 9 via the modules 150, with or without error-checking process/information 19 as further described below.

Example of Host System 14

Figure 2B:
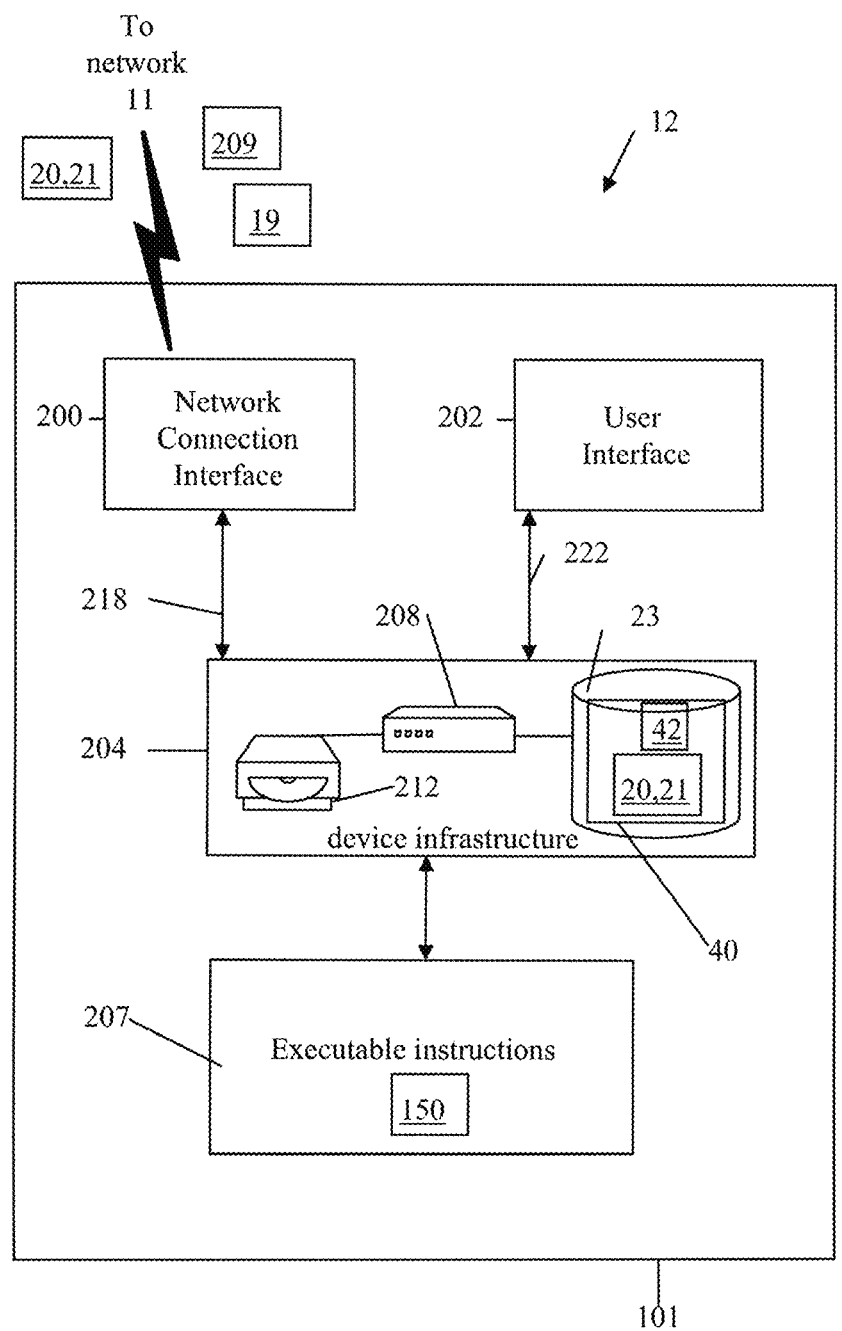
FIG. 2b is a block diagram of an computing device of a Deposit Management System of FIG. 1.
Figure 2C:
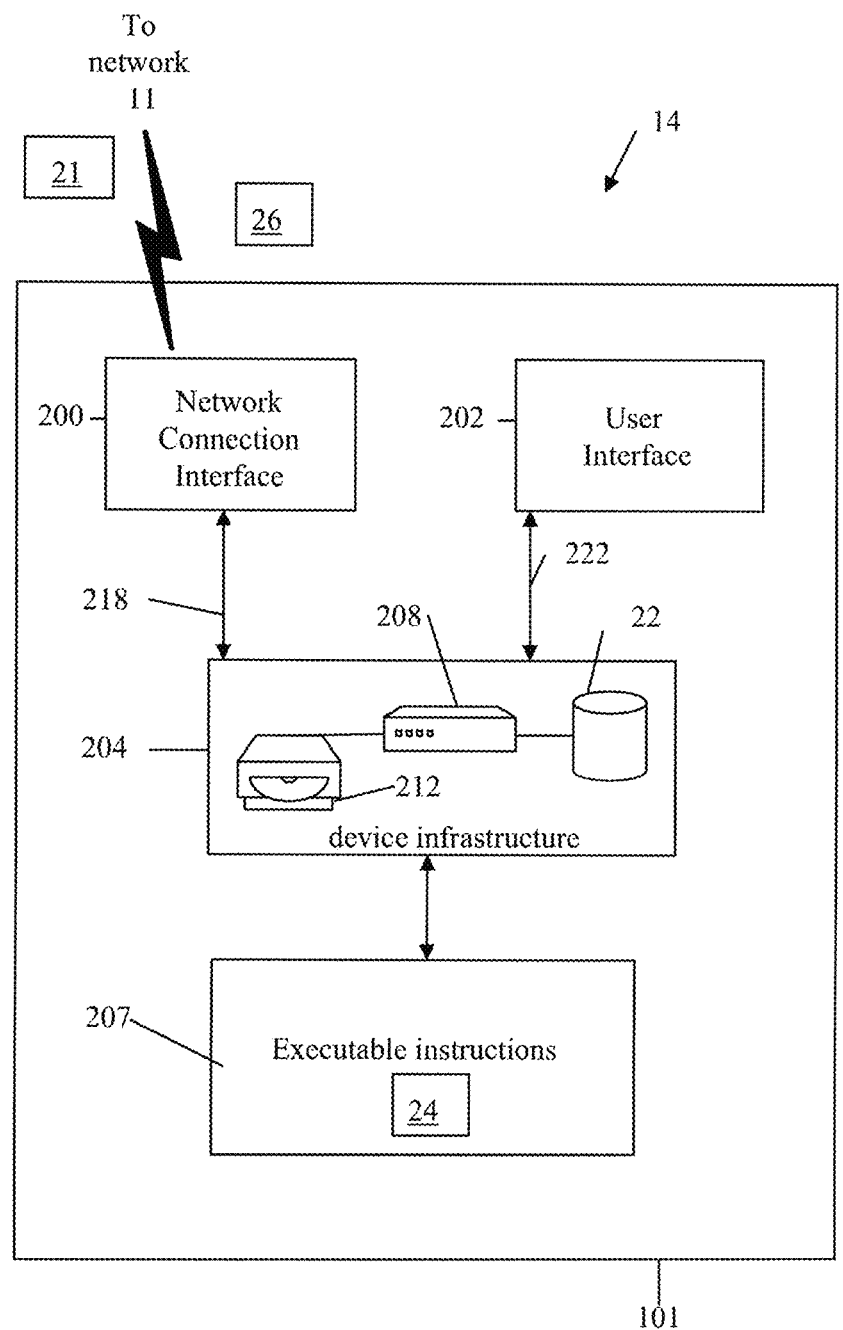
FIG. 2c is a block diagram of an computing device of a Host System of FIG. 1.

Referring to FIG. 2c, a computing device 101 of the host system 14 can include a network connection interface 200, such as a network interface card or a modem, coupled via connection 218 to a device infrastructure 204. The connection interface 200 is connectable during operation of the devices 101 to the network 11 (e.g. an intranet and/or an extranet such as the Internet), which enables the devices 101 to communicate with each other (e.g. that of the DMS 12, members 29 (not shown) and the DSs 9) as appropriate. The network 11 can support the communication of the transactions 26, and the image/data 21.

Referring again to FIG. 2c, the device 101 can also have a user interface 202, coupled to the device infrastructure 204 by connection 222, to interact with a user (e.g. administrator—not shown). The user interface 202 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 204.

Referring again to FIG. 2c, operation of the device 101 is facilitated by the device infrastructure 204. The device infrastructure 204 includes one or more computer processors 208 and can include an associated memory 22 (e.g. a random access memory). The computer processor 208 facilitates performance of the device 101 configured for the intended task (e.g. of the respective module(s) of the host system 14) through operation of the network interface 200, the user interface 202 and other application programs/hardware 207 (e.g. decisioning module 24) of the device 101 by executing task related instructions. These task related instructions can be provided by an operating system, and/or software applications 207 located in the memory 22, and/or by operability that is configured into the electronic/digital circuitry of the processor(s) 208 designed to perform the specific task(s). Further, it is recognized that the device infrastructure 204 can include a computer readable storage medium 212 coupled to the processor 208 for providing instructions to the processor 208 and/or to load/update the instructions 207. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid-state memory card, or RAM provided in the memory module 22. It should be noted that the above listed example computer readable mediums 212 can be used either alone or in combination.

Further, it is recognized that the computing device 101 can include the executable applications 207 comprising code or machine readable instructions for implementing predetermined functions/operations including those of an operating system and the host system 14 modules, for example. The processor 208 as used herein is a configured device and/or set of machine-readable instructions for performing operations as described by example above. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality of the host system 14 (e.g. modules) may be implemented in hardware, software or a combination of both. Accordingly, the use of a processor 208 as a device and/or as a set of machine-readable instructions is hereafter referred to generically as a processor/module for sake of simplicity. Further, it is recognised that the host system 14 can include one or more of the computing devices 101 (comprising hardware and/or software) for implementing the modules, as desired.

DMS 12

It is recognised that the DMS 12 can be configured other than as described below.

Referring to FIG. 4, the DMS 12 facilitates the separation of duties for collection and subsequent proofing and balancing of the collected image/data 20 prior to submission to the host system 14 as the image/data 21. The DMS 12 facilitates the operation of different tasks on the same unit of work (e.g. same batch or portion of the batch) to be performed across multiple DSs 9. Through the modules 150, the DMS 12 provides for work tasks to be performed by multiple users. While the DMS 12 provides for separate duties to be performed by different users in different locations, usability can also be provided for the same user doing all tasks for selected batches, depending upon the roles/permissions assigned to the user.

Figure 10:
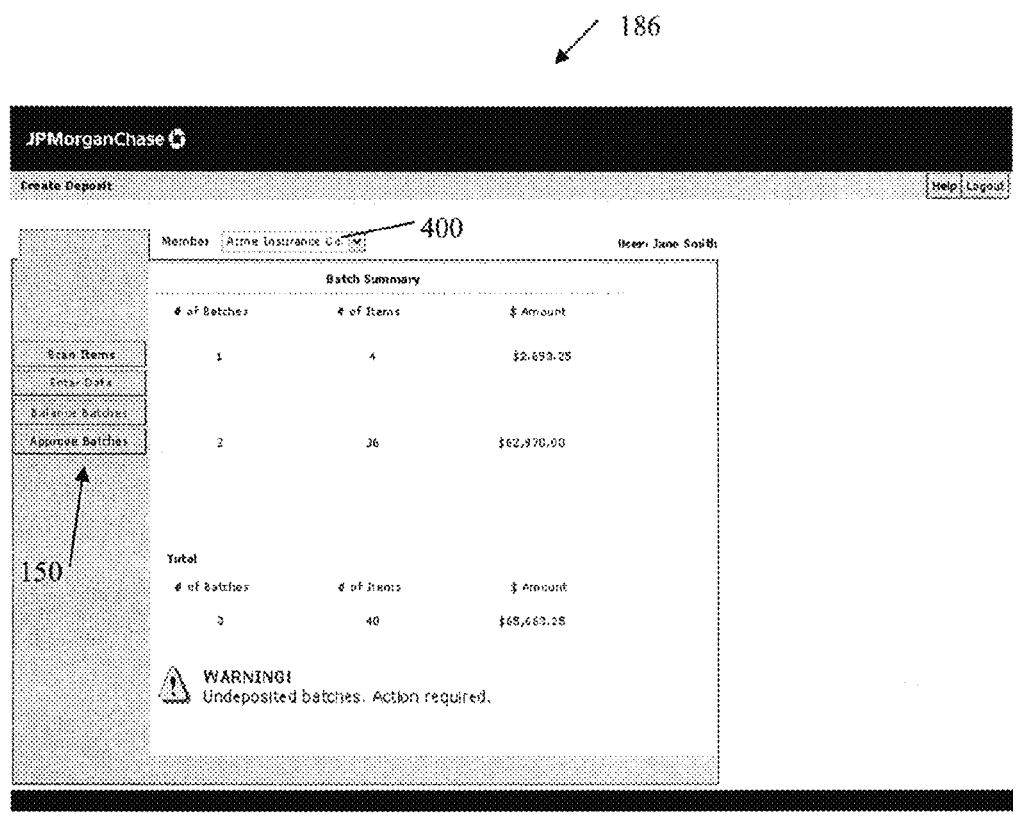
FIG. 10 shows a representative user interface screen provided by the DMS of FIG. 4.

Referring to FIG. 4, the DMS 12 coordinates the collection of the image/data 20 from the DSs 9, via the appropriate modules 150. The workflow partitioning of the image/data 20 collection is facilitated through a workflow module 187, as further described below. During image/data 20 collection, the DMS 12 can provide error-checking process/information 19 during interaction with the DSs 9, via the various modules 150, such as proofing and batch balancing features in order to create the image/data 21 for transmission to the host system 14. The DMS 12 communicates with the DSs 9 via a communication module 185, which can provide a batch summary page 186 (see FIG. 10) for facilitating access to the appropriate modules 150 by the user based on the deposit task available. As noted above, the user is registered with the DMS 12 through an assigned node 700 of the hierarchy structure 702 (see FIG. 7), and therefore the summary page 186 can be configured to display deposit information to the user, based on the status of any image/data 20 already in the storage 23 as well as permissions assigned to the node 700 of the registered user.

Communication Module 185

Referring again to FIG. 4, the DMS 12 has the communication module 185 that accepts image/data 20 packets/files transferred over the network 11 from the distributed deposit system assembly 16 (e.g. a collection or group of DSs 9—see FIG. 1). The communication module 185 can be represented as a web tier of the DMS 12 for providing a central web interface/portal (e.g. web service) for a selected group (or all) of the DSs 9. Further, the communication module 185 identifies any representative information 42 (e.g. header information of the image/data 20 file/package, data collection particulars, etc.) included with the image/data 20 for storing in the file table 40.

Figure 3A:
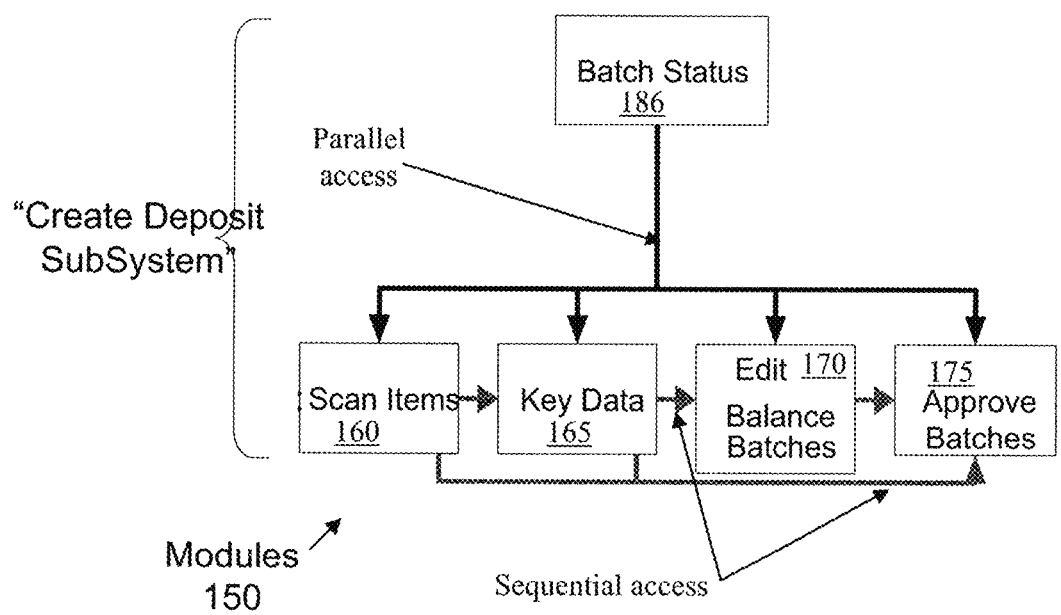
FIGS. 3a and 3b show example workflows of the data collection and processing of the documents of FIG. 1.

For example, referring to FIGS. 3a and 4, upon entry/login into the DMS 12, the communication module 185 can display a "Batch-Status screen" 186 (batch summary page—see FIG. 10) on the user interface 202 of the DS 9 for any pending batches. The Batch-Status screen 186 can provide the following: the user to select a location 400 or select <All Locations>; display to the user information 42 conveying the amount of work (batches) queued at each user module 150, waiting to be processed; information 42 conveyed can be relative to the currently selected Location and Account; specifically inform 42 the user whether balanced batches are waiting for approval; and allow the user to select from amongst the list of user modules 150.

The primary (first) screen of each Module 150 can provide an "Exit" button that will cause the user to be returned to the Batch-Status screen 186. The Exit button can consistently return the user to the Batch-Status screen 186. For the screens in general, the screens that show values that may be changing while being displayed can be automatically refreshed. The screens can also contain a manual "Refresh" button that will allow the user to force a refresh. Further, all screens can display a "path" to the current module 150. The path can be constructed as <SubSystem>/<Module>. For example, the Balance Batches module 170 can display "Create Deposit/Balance Batches". As a generally guideline, the buttons and controls of the screens can be visible to the user only if the user has permission to use the corresponding task/function. For example, buttons and controls that are displayed but whose functionality is not currently available given the current state of the application (and/or permissions of the user) can be disabled/grayed out or otherwise hidden.

Decisioning Engine/Service 502

Referring again to FIGS. 1 and 4, the error-checking process/information 19 communicated between the DMS 12 and the DSs 9 can be used as part of the distributed decisioning environment 501, see FIG. 5, for handling situations in which certain image/data 20 are deemed not storable (i.e. eligible for registration with the database 22 of the host system 14). These situations can include exception criteria 188 such as but not limited to: duplicate image/data 20 such that the image/data 20 being captured is a duplicate of image/data already submitted; bad batch file meaning that the format of the image/data 20 submission is not supported by the network system 10; general insertion exception such that a bad attempt is identified for insertion of the complete contents of the image/data 20 (e.g. as a file, batch, individual item, etc. . . . ) into the database 23 and may be eligible for an insertion retry; invalid member ID of the document 38 with respect to known members 29 registered with the host system 14; invalid scanner 16 exception such that the image/data 20 may originate from a non-supported scanner 16 manufacturer; minimum information exception where the image file of the image/data 20 and/or the data portion of the image/data 20 are deemed to not contain the minimum amount of transactional information (e.g. IRN and owner code) to allow the subsequent transaction 26 processing to proceed.

It is recognised that at least part of the exception criteria 188 can be used by a decisioning engine/service 502 (see FIG. 4) of the DMS 12 and/or a decisioning engine 24 of the host system 14, as further described below in relation to the distributed decisioning environment 501. For example, the decisioning engine/service 502 can be used to interact with the modules 150 with respect to review of the image/data 20 obtained and/or can be used to configure the respective modules 150 for implementation of the exception criteria 188 directly by the modules 150 themselves.

Transfer Module 180

Referring again to FIG. 4, the DMS 12 has a transfer module 180 for communicating the image/data 21 as packets/files to the host system 14. The transfer module 180 can delete the stored copy of the image/data 20 and/or the image data 21 from the memory 23 once the image/data 21 has been successfully stored/registered (e.g. acknowledged by the host system 14) in the database 22 of the host system 14. Alternatively, the DMS 12 shall store the image/data 20,21 for some specified time period (e.g. number of days). For example, transactional data of the image/data 20,21 can be stored for a certain period (e.g. 90 days) and the image data of the image/data 20,21 can be stored images for the same or different period (e.g. 90 days). It is recognised that the use of terminology "file" is interchangeable with the term image/data 20, where applicable. The communicated files may contain multiple images and associated data, as desired.

The transfer module 180 can organise or otherwise format/pre-process the image/data 20 to produce the corresponding image/data 21 consumable by the host system 14 in the pre-defined/expected format. For example, the transfer module 180 can assemble (e.g. combine or dissect) the received image/data 20 according to predefined criteria such as but not limited to: batch size representing the desired batch by the host system 14 when polling (e.g. synchronous image/data 21 download) the DMS 12, where the batch size can be anywhere from one item record to a set plurality of item records 58 (e.g. a batch record 56 or file record 54)—see FIG. 2a; image/data 20 combined from selected DS(s) 9; image/data 20 combined for selected member(s) 29; image/data 20 reorganised according to type, receipt time, or other desired criteria listed or not listed above; or a combination thereof. Further, the transfer module 180 can apply some decisioning criteria 188 to the received image/data 20 when formulating the image/data 21, as desired.

The Deposit Transfer module 180 transfers (i.e. uploads) approved batches to the host system 14 and checks the host for acknowledgements for previously transferred, but not yet successfully acknowledged deposits.

Configuration Module 183

The DMS 12 can also have a configuration module 183 for receive new/updates (e.g. configuration packages 209) for scanner 16 software (for the DSs 9) and configuration data for the DMS 12 (e.g. entry forms, GUI modifications, decisioning rules, etc. . . . ) for use by the respective modules 150, 180, 182, 183, 185, 187, and 502, for example. These configuration packages 209 can be provided by the host system 14 and implemented by the administrator of the DMS 12.

The configuration module 183 can also be responsible for user ID and password management of the DS 9 users (e.g. provide a centralized management of passwords and a single sign-on from the DS 9). This user ID and password management can be done in isolation or in combination with the host system 14, as desired. Further, the configuration module 183 can also be responsible for roles and permissions of the users (e.g. using the hierarchical structure 702 as further described below), such as providing centralized management of the roles and permissions of the user with respect to access to some or all of the functionality of the modules 150. This roles and permissions management can be done in isolation or in combination with the host system 14, as desired.

Workflow Module 187

The workflow module 187 coordinates access to the database 23 using features such as but not limited to: searching; decisioning via the decisioning engine 502; activity logging; distribution; file/batch access; and individual document 18 information access. It is recognised that the functionality provided by the workflow module 187 can be implemented as a series of respective software/hardware modules, as desired. The workflow module 187 can include features such as but not limited to: job scheduling; distribution; request processing; storage of images/data 20; and ACH processing implemented by the modules 180, 150 and 502.

For example, workflow module 187 can monitor the representative information 42 used/provided by the modules 150 and store the representative information 42 in the file table 40 for subsequent access by the same and/or different module 150 (e.g. for the same or different user session). Further, it is recognised that the workflow module 187 can provide updates to the representative information 42 of the file table 40, as well as add any additional representative information 42 not included in the received image/data 20 but desired by the host system 14.

The representative information 42 can also be referred to as registration information such that the information 42 can represent indexing data for the captured image/data 20 such that the indexing data is stored in the tables 40 to facilitate subsequent retrieval of the stored image/data 20 when accessed by the DS 9 through the modules 150. The indexing data (i.e. part of the representative information 42) can include information such as but not limited to: the time the image/data 20 arrived at the database 23; the time the image/data 20 was registered in the database 23; the filename of the image/data 20 or other identification; and the status of the image/data 20 (e.g. decisioning status, storage status, processing status, etc. . . . ).

The workflow module 187 can be used to perform logging/auditing functions of the DMS 12 during collection and subsequent processing (e.g. activities and events) of the image/data 20. For example, functions such as but not limited to: Audit Logging—provides detailed audit logging for activities such as error messages and all relevant events pertaining to collection and/or processing of the image/data 20 (e.g. the activity log can indicate which users processed which batches through which modules 150). In the case where a user exited in the midst of a batch and another user completed the work on the batch, both users will be recorded in the activity log (e.g. as separate line items).

For activity logging, all activities logged by the workflow module 187 can be described as those audit like actions that are performed by the user, or possibly by an automated process in order to track the processing of image/data 20. The DMS 12 Framework can log the following Activities; Activity ID, Activity Description, and user associated with Activity ID. Further, the workflow module 187 can log entry by user to the DMS 12 upon initial entry as well as exit by user upon exit. Event Logging can be generally defined as those occurrences that are candidates for notification to Operations. For example, events can be classified as being one of three types as follows: Information (generally provides positive confirmation that an expected event actually occurred); warning (generally indicates that data processing is occurring within boundaries, but is close to tolerances, or that a situation has occurred that is not normal) such that closer monitoring is recommended and/or operations may choose to take action; and Error (indicates that a negative condition has arisen where operations are expected to investigate and take action).

In view of the above, it is recognised that the activity/event auditing/logging can be implemented by a logging module (not shown), for example as a subset of the workflow module 187, as desired.

Further, it is recognised that the workflow module 187 can be configured to facilitate locking or otherwise restricting access of a respective batch to other users, for example for a specified period of time. For example, for the scanning operation, if the creation of the batch for a collection of documents 18 is interrupted before the user signs off (e.g. network interruption), the user is given the option of resuming completion of the interrupted batch up logging back into the DMS 12. For the operations of key data, batch balancing, and/or batch approval, the specified period of time can be for a certain period within one day, thus allowing another user to access and contribute to an existing batch once the specified period of time expires. For example, if a first user accesses/selects a scanned batch from the summary page 186 and then begins key data entry on the items contained therein, in the event of user session interruption, another different user can select that abandoned batch once the specified period of time expires (e.g. 10 minutes) from their respective summary page 186. Further, in the event of another user picking up an abandoned batch, the second user may not have any knowledge/indication of the work done on the batch by the previous user.

Monitoring Module 182

The DMS 12 can have a monitoring module 182 (working in conjunction with the modules 150 and/or the workflow module 187) for updating representative information 42 in the memory 23, including the status of the collection of the image/data 20 as coordinated by the operation of the various modules 150. For example, the monitoring module 182 can oversee the progress made in the collection of the image/data 20 as it progresses through each of the modules 150 (e.g. scanning to key data to batch balancing to batch approval to conversion to image/data 21 to submission and confirmation by the host system 14). During the data collection process, the monitoring module 182 can assess the status of the batch states and update the representative information 42 accordingly, through recording the present batch status such as but not limited to: open—the list of items contained in the batch is in a state of flux, that is items are being added or removed (e.g. scanning functionality of the scanning module 160 is being used by the DS 9); closed—the list of items within the batch is static (e.g. the initial scanning of items for the batch has been completed); and in process (Claimed, Locked)—the user or DMS 12 (or the host system 14) is currently processing the batch and possibly changing data, therefore no other user or process can access the batch. The access of the representative information 42 by the modules 150 and communication module 185, e.g. via the monitoring module 182, can be used for batch management by providing a visible status of all the batches involved in the collection of the image/data 20. The status can be displayed to the user of the DS 9 using various screens 186, 192 (see FIGS. 10, 11).

Modules 150

The modules 150 facilitate the publication of forms (e.g. screens 186, 192—see FIGS. 10, 11) on the user interface 202 of the DS 9, in order to coordinate the collection of the image/data 20 through all of the various functions supplied by the modules 150 (e.g. scanning, data keying, balancing, and approving). These screens of the modules 150, 185 can be used to note exceptions (information 19) present in the submitted image/data 20 (e.g. show or otherwise highlight data errors) as well as to present selectable action items to the user for use in correction of the noted exceptions. In one embodiment, when the modules 150 manipulate batches, there can be a number of indicators (e.g. information 19) presented to the user of previous image/data 20 activity that can be used, by the user, to make a decision (e.g. remove, edit, approve, balance). These indicators can be selected from the following indicators such as but not limited to: an indication as to whether MICR data was changed or in error; an indication as to whether an image quality suspect item was accepted or in error; and an indication as to whether duplicate protection was overridden or in error for a particular item.

Further details of the modules 150 are provided in the below Modules 150 section.

Example Configuration of DMS 12

Referring to FIG. 2b, the computing device 101 of the DMS 12 can include the network connection interface 200, such as a network interface card or a modem, coupled via connection 218 to the device infrastructure 204. The connection interface 200 is connectable during operation of the devices 101 to the network 11 (e.g. an intranet and/or an extranet such as the Internet), which enables the devices 101 to communicate with each other (e.g. that of the host system 14 and the DSs 9) as appropriate. The network 11 can support the communication of the information 19, the configuration information 209, and the image/data 20,21.

Referring again to FIG. 2b, the device 101 can also have the user interface 202, coupled to the device infrastructure 204 by connection 222, to interact with a user (e.g. administrator—not shown). The user interface 202 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 204.

Referring again to FIG. 2b, operation of the device 101 is facilitated by the device infrastructure 204. The device infrastructure 204 includes one or more computer processors 208 and can include an associated memory 23 (e.g. a random access memory). The computer processor 208 facilitates performance of the device 101 configured for the intended task (e.g. of the respective module(s) 150, 182, 183, 185, 187, 180, 502) through operation of the network interface 200, the user interface 202 and other application programs/hardware 207 of the device 101 by executing task related instructions. These task related instructions can be provided by an operating system, and/or software applications 207 located in the memory 23, and/or by operability that is configured into the electronic/digital circuitry of the processor(s) 208 designed to perform the specific task(s). Further, it is recognized that the device infrastructure 204 can include the computer readable storage medium 212 coupled to the processor 208 for providing instructions to the processor 208 and/or to load/update the instructions 207. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid-state memory card, or RAM provided in the memory module 210. It should be noted that the above listed example computer readable mediums 212 can be used either alone or in combination.

Further, it is recognized that the computing device 101 can include the executable applications 207 comprising code or machine readable instructions for implementing predetermined functions/operations including those of an operating system and the modules 150, 182, 183, 185, 187, 180, 502, for example. The processor 208 as used herein is a configured device and/or set of machine-readable instructions for performing operations as described by example above. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality of the DMS 12 (e.g. modules) may be implemented in hardware, software or a combination of both. Accordingly, the use of a processor 208 as a device and/or as a set of machine-readable instructions is hereafter referred to generically as a processor/module for sake of simplicity. Further, it is recognised that the DMS 12 can include one or more of the computing devices 101 (comprising hardware and/or software) for implementing the modules, as desired.

Memory 23

The memory 23 is used to store the incoming image/data 20 as well as to store (e.g. temporarily) this data when processed into the image/data 21 suitable for consumption by the host system 14. The image/data 20,21 can be stored in the file table 40, which can be generically referred to as a physical/logical representation of a data structure for providing a specialized format for organizing and storing the image/data 20,21. General data structure types can include types such as but not limited to an array, a file, a record, a table, a tree, and so on. In general, any data structure is designed to organize data to suit a specific purpose so that the data can be accessed and worked with in appropriate ways. In the context of the present network system 10, the data structure may be selected or otherwise designed to store data for the purpose of working on the data with various algorithms executed by components of the DBS 12. It is recognised that the terminology of a table is interchangeable with that of a data structure with reference to the components of the network system 10. It is recognised that the representative/logging information 42 of the image/data 20,21 can be stored in the file table 40.

The representative information 42 can further include information such as but not limited to: image/data type; file/package ID; file/package name; a priority indicator (e.g. a receipt time indicator); a processing status indicator for indicating a real time processing status for the image/data 20 by the DBS 12 as well as a processing status indicator for indicating a real time processing status for the image/data 21 by the host system 14 (e.g. received by the host system 14 but not yet processed, received by the host system 14 and processed, or a combination thereof); a member ID of the members 29 associated with the image/data 20; a client ID for the DSs 9 associated with the image/data 20; processed time indicating the amount of time taken by the host system 14 to update the status indicator from received to processed; and an attempts indicator for representing the number of attempts were taken to properly receive the image/data 21 by the host system 14, to properly receive the image/data 21 transferred to the host system 14, to properly process the image/data 21 by the decisioning engine 24 of the host system 12, or a combination thereof. It is recognised that the information 42 can include details of the collection process of the image/data 20, as further described below.

Ds 9

Referring to FIGS. 1 and 4, the system 10 can accommodate different types of users of the DS 9, for example generalist users and/or specialist users. The generalist user may, after scanning the item document 18, attend to keying the data, balancing, and then approving the deposit. Alternatively, the user may be a "specialist", e.g. only one of the four functions (each function being performed by one of the four modules 160, 165, 170, 175), is performed by the specialist user, for instance, scanning. The significance of this is that the functions may be performed in different locations, at different times, and by different users, or, a single user may perform the functions, at one or more sittings.

The DS 9 can be represented as a client application of the DMS 12 that requires little to no local data storage (e.g. of the image/data 20) and little to no local executables pertaining to the functionality provided by the modules 150. Accordingly, in one embodiment, the DS 9 can be implemented as a "thin client" such that: no "hard" footprint (i.e. no executable) of the functionality provided by the modules 150 are stored/installed on the device 101 (see FIG. 2a) of the DS 9; any components downloaded from the DMS 12 can be run within the browser of the DS 9 thereby helping to avoids most local security constraints; no local data storage of the image/data 20; all image/data 20 is transferred to the DMS 12 as it is captured or otherwise entered into the user interface 202 of the Ds 9; and the client side settings can be stored in "cookies" of the DS 9 browser.

Further, the DS 9 can be configured as a Windows-based application (or other operating system application) that can reside on any computer 101 (see FIG. 2a) running Windows, with both browser-based and terminal applications available (e.g. included in the executable instructions 207 residing for example in memory 210). For example, the application can include a network browser 207 for communicating with the DMS 12 over the network 11. Further, the DS 9 can provide an interface 207 to the peripheral check reader (e.g. scanner 16) that captures through the appropriate module 150 (see FIG. 4) the image of the document 18, as well as any applicable account and routing information from the MICR (Magnetic Ink Character Recognition) line of the document 18 (as identified by the scanner 16). The DS 9 can provide for additional payee or biller information to be added to transaction data for assembly as the image/data 20, through the appropriate interaction/operation with the module(s) 150 (see FIG. 4), as configured.

The DS 9 can be a personal computer or other computing device 101 (see FIG. 2a) for running software/hardware configured to: convert the document 18 into the digital image/data 20, upload the image/data 20 to the DMS 12 via the network 11 through interaction/operation of the appropriate module(s) 150, receive information 19 (e.g. acknowledgements) through interaction/operation of the appropriate module(s) 150 as to the status/suitability of the submitted image/data 20, receive new/updates (e.g. configuration packages 209) for scanner 16 software and computer software from the DMS 12, as well as obtain information on the network 11 address and the communication protocols and/or image/data 20 format expected by the DMS 12.

Further, it is recognized that the DS 9 can have an architecture similarly described for the DMS 12, namely including such as but not limited to the network interface 200, the infrastructure 204, the user interface 202, the computer processor 208, and the computer readable medium 212. For example, the user interface 202 for the device 101 when used by the user can be configured to interact with operation of the scanner 16, and the web browser to facilitate interaction with the modules 150 of the DBS 12 during collection/generation of the image/data 20 and processing of the information 19.

It will be understood in view of the above that the computing devices 101 of the DSs 9, the DMS 12, and the host system 14 may be, for example, personal computers, personal digital assistants, mobile phones, and servers. Further, it is recognised that each server-computing device 101, although depicted as a single computer system, may be implemented as a network of computer processors, as desired.

Further, it will be understood by a person skilled in the art that the memory/storage 22,23 described herein is the place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 22,23 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 22,23 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and midrange systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 22,23 can also be defined as an electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

Modules 150

Referring to FIGS. 3a,b and 4, the module 150 types can be such as but not limited to: the scan items module 160 providing for scanning of documents 18 and, optionally, the entry of data associated with the documents 18; the key data module 165 providing for key entry of data associated with previously scanned items; the edit/balance batches module 170 providing for item amounts and batch totals to be adjusted to bring a batch into balance; and the review/approval module 175 providing for batches to be managed within the system 10 and to be candidates as image/data 21 for submission to the host system 14.

The modules 150 also provide that the image/data 20 for each of the documents 18 in the batch (as well as image/data relative to the group of items in the batch) is reviewed for compliance with predetermined criteria (error-checking process/information 19), and each item/batch that fails to comply with said criteria is investigated by the user or other users of the network system 10 (at the same or other workflow sessions with the same or other ones of the modules 150, by the same or different user(s) that caused/contributed the exception to occur).

Provision of the separation of duties, for image/data 20 collections, by the DMS 12 is maximized dependent upon the number of individual module 150 types. A different user, potentially at different physical locations of the DSs 9, may operate each module 150. As each batch moves from module 150 to module 150 under workflow control of the workflow module 187, the different users can perform the tasks/functions associated with those modules 150. Therefore, different users may perform different tasks on the same batch depending on what module 150 they are operating. With respect to a minimum module type separation of duties, the same user may operate all modules 150, such that the same user performs all permitted tasks/functions on each batch.

It is recognised that within each module 150, some tasks/functions can require a different permission than is required to run the module. For example, the user may be able to scan items, but may not be able to accept duplicate items. This task may require the credentials of a different user (for which the DMS 12 will prompt for using the workflow module 187).

Referring to FIG. 3a, in general, user navigation from module 150 to module 150 can require return from the current user module to the Batch-Status-Screen 186, then selection of, and entry into, the next user module can be done. For example, once the user has completed all activities and events for the scanning module 160, the user can then access (if permitted) the key data module 165 for continuing to process the image/data 20 of the batch. In general, users can enter modules 150 from the Batch-Status-Screen 186 for the purpose of performing the functions provided by that specific module 160, 165, 170, 175. Direct user movement forward from one module 150 to the next during collection of the image/data 20 can also be provided, however, this will generally be the result of the user processing specific batches throughout from one module 150 to the next.

Further, it is recognised that different modules 150 can be skipped during the image/data 20 collection process if the respective image/data 20 is entered correctly, as decided upon by the decisioning engine 502. Further, it is recognised that certain downstream modules 150 of the workflow can return a current item/batch for additional action by one of the upstream modules 150 (e.g. in the event of a serious error detected downstream due to an override done upstream).

Figure 3B:
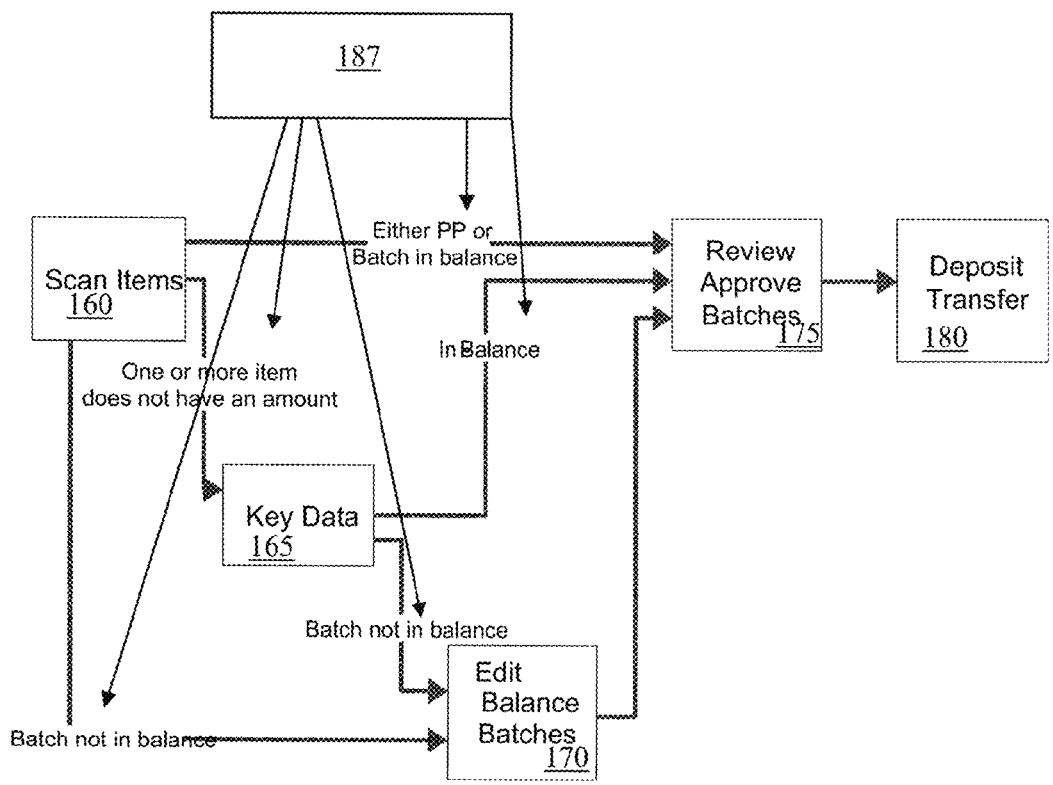

Referring to FIG. 3b, as a given module 150 completes each batch, the batch can automatically move or otherwise become available to the next module 150. It is recognised that the "next" module 150 can depend on the status of the batch (as coordinated by the workflow module 187) as it exits the previous module 150. Example Unit of Work flows for the batches are shown by example in FIG. 3b.

In view of the above, it is noted that error/compliance checking of the image/data 20 at each of the modules 150, for the data collection procedure, can be done either synchronously, asynchronously, or both. For example, once certain image/data 20 is uploaded to the DMS 12, the decisioning engine 502 uses the criteria 188 to provide the error feedback information 19 (e.g. ok, overridden ok, required further actions identified, etc.) to the user. The arrival of this information to the user on the user interface 202 can be sequential to the item/task at hand of the user and/or can be parallel to the item/task at hand of the user. For example, in scanning a document 18 and the MICR data 20 is detected as erroneous, the user can either wait to get the error feedback information 19 from the DMS 12 on that image/data 20 uploaded or the user can be in the process of uploading image/data 20 for other documents 18 of the same or different batch before the error feedback information 19 is received from the DMS 12 on the earlier uploaded image/data 20. Accordingly, it is recognised that the DMS 12 provides the ability to submit or otherwise collect/process the image/data 20 of a plurality of documents 18 (and batches) in parallel and/or sequentially, as desired.

Scan Items Module 160

The DMS 12 provides scan items module 160 that coordinates the function of scanning of financial items (e.g. documents 18), and optionally the entry of associated key data, as desired. For example, if the user exits the module 160 before closing all of the batches, the user can be returned to those same batches upon re-entry into the module 160, since it is assumed that the user has all of the physical documents 18 needed for scanning via their associated scanner 16. For all other modules 150, if the user exits the module 165, 170, 175 while still processing a batch, the user may not be returned to the same batch upon re-entry into the module 165, 170, 175. In this case, upon user exit, the batch can be returned to a batch queue 189 (see FIG. 4) and can be available to be completed by any other user for which the batch is within their scope of visibility via the summary page 186 (see FIG. 10). Further, upon user re-entry, the user can, if they wish, and if the batch is still available, re-select the same batch for completion. However, it is possible that another user has since selected and therefore the original user would be barred or otherwise locked from accessing this batch until completed or otherwise exited by the other user.

The module 160 can provide for scanning the documents 18 into logically separated batches, defined for example by a combination of: location being a physical location for which the items belong; account such as a Ledger Account and can be a member type; and a transaction type (e.g. PP, PNP, BOC). For the Person-Present type, items scanned within transactions that are run under "Person-Present" scanner mode can be flagged in the image/data 20 as a "POP" item. For the Person-Not-Present type, the items scanned within transactions that are run under "Person-Not-Present" mode can be flagged image/data 20 as an "ARC" item. For the Back-Office-Capture type, items scanned within transactions that are run under "Back-Office-Capture" mode can be flagged image/data 20 as "ARC" items.

The module 160 can operate in two modes in which image/data 20 can be entered, namely: Single Mode in which the items can be scanned one at a time and data entry can be keyed in-line with the scanning as each item is scanned; and Batch Mode in which one or more items can be scanned in succession and data entry can be performed at a later time, after the batch has been closed.

Figure 11:
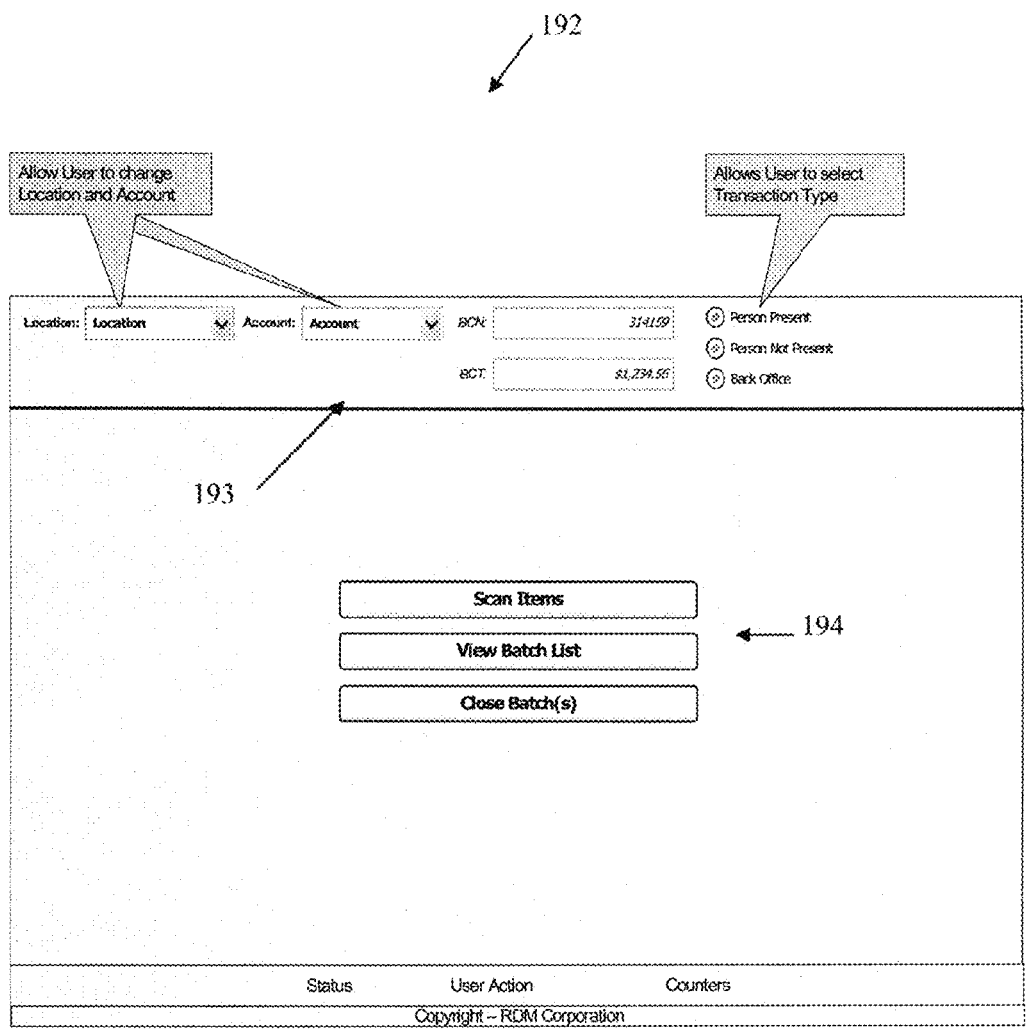
FIG. 11 is a further embodiment of the user interface screen of FIG. 10.

Referring to FIGS. 4 and 11, the module 160 provides a Batch Parameters screen 192 to the user on the DS 9 user interface 202 (see FIG. 2a), having a number of batch parameters 193 defined (e.g. for selection by the user). The screen 192 can display the batch parameter 193 of Location and Account for the item, such that for example the Location list can be a list of the "Member Description" for those members 29 in the hierarchy 702 at or below the users current node that have their Member Type set to "Location". The Account list parameter 193 can be a list of those members 29 in the hierarchy 702 below the currently selected Location that have their Member Type set to "Account". The screen 192 can display the Transaction Type for the item. The screen 192 can display a Batch Control Number (BCN) and Batch Control Total (BCT) for the current batch as specified by the currently selected Location, Account, and Transaction Type Modes. After setting of the parameters 193 (to be included as part of the image/data 20), the user can select button 194 for starting the scan of the items, viewing batch lists and/or closing the current batch, for example. The same user in the same location, or by a different user and/or a different location can enter any required key data.

During scanning of the items, various error-checking process/information 19 can be performed such that various item acceptance processes can be run against the item where the user may need to handle Item Acceptance exceptions if/as they occur, such as but not limited to: presenting a key data input form with pre-populated results of Auto Data Completion from the scanning process such that the User can input any remaining fields and can correct incorrect pre-populated fields of the image/data 20; Data Field Validation exceptions; and Item Decisioning.

When the item is scanned, and the item data and images have been captured, various item acceptance processes are run to determine whether the item can be accepted as scanned, such as but not limited to: MICR Data Validation though rescan and/or manual keying of the MICR data; Duplicate Checking via the MICR data (as validated) to determine whether the item is a duplicate; Image Validation such that the front image shall be checked to ensure that it is of sufficient quality; correction of Automatic Data Completion processes (e.g. Payor Lookup and CAR/LAR—automatic amount recognition) through entering of data into the remaining fields and/or modifying the data in any of the pre-populated fields;

select items from the Batch List and have the items deleted from the Batch; and select items from the Batch List and be allowed to edit the item. Item decisioning can be performed at this stage of the processing by the local decisioning engine 502, as described.

Further, it is recognised that if image quality is identified as an issue for a particular item, the user can cause the item to be accepted, regardless of the image quality issue. The system can also permit the user to override duplicate protection for a particular item. After the item has been accepted, automatic data completion processes can be run, for example, automatic amount recognition (CAR/LAR). Subsequently, the user can be presented with a prepopulated data entry form (and the scanned image), and the user can be allowed to enter data into any remaining fields and modify any data in any of the prepopulated fields. Item Decisioning is performed by the system after the data entry step.

In view of the above events and activities performed by the user in scanning the documents 18, these events and activities (e.g. scanning events/activities, error correction events/activities, and/or key data events/activities) can be recorded by the workflow module 187 in the information 42.

Key Data Module 165

The DMS 12 provides the key data module 165 that allows for the key entry of data associated with previously scanned items. Single Data entry and exception handling can be in-line with item scanning, sometimes referred to as "Key now". The Key Data module 165 allows users to select a batch that requires Data Entry from a respective screen of the user interface 202 (e.g. the summary screen 186) and to enter the data (using a key data screen—not shown) for each item within the selected batch.

For example, upon entry into the Key Data module 165, the module 165 can display a list of all Batches that require data to be entered. For each Batch, the view can display the following details (columns), such as but not limited to: Date/Time Batch was created; Batch Control Number; Account Name; and Number of items in the Batch. The list can be presented grouped by Location, with the batches within each location presented in chronological order based on Batch Create Time (from oldest to newest). Further, a "Return to Batch Status" button of the screen can cause the user to return to the Batch Status screen 186.

In view of the above events and activities performed by the user in keying data 20 for the documents 18, these events and activities (e.g. data entry/removal/amendment events/activities, batch access events/activities) can be recorded by the workflow module 187 in the information 42.

Balance Batches Module 170

The DMS 12 provides the balance batches module 170 that can allow for item amounts and batch totals to be adjusted in order to bring a batch into balance. The module 170 allows users to select a batch that requires balancing from a respective screen of the user interface 202 (e.g. the summary screen 186) and to enter the data (using a balance screen—not shown) for pertinent items within the selected batch. The screen can show the front image of the item that is currently selected in an item Amount List. For example, upon entry into the module 170, the module 170 can display a list of all Batches that require balancing.

For each Batch, the view can display the following details (columns), such as but not limited to: Date/Time Batch was created; Batch Control Number; Account Name; Number of items in the Batch; and batch control total. The list can be presented grouped by Location, with the batches within each location presented in chronological order based on Batch Create Time (from oldest to newest). Further, a "Return to Batch Status" button of the screen can cause the user to return to the Batch Status screen 186.

The balancing screen can show a batch summary area showing: the item Amount Total, being the total of all amounts currently assigned to items; the Batch Control Total; and the difference between the item Amount Total and the Batch Control Total (i.e. equal to zero if the batch is balanced). The screen can also display a list of the amounts associated with all items in the current batch.

The user can enter a new amount for the currently selected item in the item Amount List, such that when the amount is changed, the item Amount Total and the Difference can be automatically updated. The user can change the Batch Control Total by changing focus to the Batch Control Total and entering a new value, such that when the BCT is changed the Difference can be automatically updated. The user can also select a "Done" button to cause the user to be returned to the Balance Batches Batch list (e.g. the summary page 186). Accordingly, from the list, the user may then select another batch and perform the same balancing functions. It is recognised that if the Batch is in-balance, the batch can be moved forward in the workflow. Otherwise, if the Batch is not in-balance, the batch can remain queued at this module 165 (and can remain visible in the Balance Batches Batch List).

In view of the above events and activities performed by the user in balancing the image/data 20 for the documents 18, these events and activities (e.g. data entry/removal/amendment events/activities, batch/item access events/activities) can be recorded by the workflow module 187 in the information 42.

Approval Module 175

The DMS 12 provides the approval module 175 that can allow batches to be managed within the DMS 12, and to be approved for settlement, thereby providing the distributed decisioning environment 501 (see FIG. 5) for functionality otherwise conducted by the decisioning engine 24 of the host system 14 (see FIG. 1). For example, the Approve Batches module 175 can facilitate users to review batches (using an approval screen—not shown) that have been balanced, but not yet "injected" into the host system 14 for deposit processing. The user can make approval decisions, and approve Batches for deposit. It is recognised that prior to approval, the module 175 can allow for items to be edited or voided. Further, the module 175 can allow the user to review deposits previously made and to provide visual confirmation of successful "Deposit" (i.e. file upload to the host system 14), or indication otherwise. Further, it is recognised that the module 175 may receive Units of Work directly from Scan Items, from Key Data, or from Balance Batches modules and can forward Units of Work (e.g. completed batches) to the transfer module 180.

The batch view approval screen can display a list of all batches that have been balanced, but not yet included in a deposit. The screen can show the front image of the items selected. §For each batch, the view will display the following details (columns), such as but not limited to: Date/Time Batch was ready for approval; Batch Control Number; Number of items; Total Dollars; indication as to whether, MICR data was changed, Image Quality suspect was accepted, and/or duplicate detection was overridden; and a selectable checkbox (e.g. approved). The user can expand the batch in the list to display all of the items within it. This can be implemented as a grid control with nested rows. For each item, the view can display the following details (columns), such as but not limited to: Transaction Type; Date/Time Item was scanned; IRN; R/T Number; Account Number; item Number; Dollar Amount; and indication as to whether, MICR was changed, image quality failure was overridden, and/or duplicate detection was overridden.

In view of the above information, the user of the module 175 can select an item from the list and open the "Edit Item" window, causing a "Edit Item" screen to be displayed for facilitating editing of the image/data 20 associated therewith. All changes made to items via the edit function can be included when the batch is approved for Deposit. Further, the BCT can be re-calculated to account for any amount change. Also, the user can select an item from the list and "Void" the item. If the voided item is the only unvoided item in the batch, then the batch can be removed completely.

Further, for each Deposit, the screen view can display the following details (columns), such as but not limited to; Date/Time Deposit was created; User Name (of the person who created the Deposit); Deposit Control Number; Number of items; Deposit Control Total; Date/Time Deposit Transfer was initiated; Date/Time of Deposit status; and Deposit status of either "Submitting" or "Accepted" or "Denied". The user can expand a deposit to list the batches within it.

In view of the above events and activities performed by the user in approving the image/data 20 for the documents 18, these events and activities (e.g. data entry/removal/amendment events/activities, batch/item access events/activities) can be recorded by the workflow module 187 in the information 42.

Hierarchy 702

Referring to FIG. 7, operation of the network system 10 can be structured such that there are a series of member nodes 700 (e.g. parent, child), organised in the hierarchy 702 (i.e. child node 700 inherits or otherwise shares traits, data, rules with the parent node(s) 700), that are associated with respective DS 9 (e.g. controlled access to the DMS 12 and the modules 150 functionality) as part of the overall network of image/data capture of documents 18. The actual image/data 20 that are associated with each of the nodes 700 is stored preferably centrally in the database 23 of the DMS 12, including the decisioning/processing associated with each of the nodes 700 that originated the image/data 20. The hierarchy 702 provides a hierarchical access control mechanism for the network system 10 that explicitly defines image/data 20 access relationships (and inheritance of information). Further, use of the hierarchy 702 provides for operation of the DS 9 with respect to the DMS 12 for the decisioning process 814 (see FIG. 6), image/data 20.

An operator or other system administrator(s) can use the tool 508 (see FIG. 4) to review or otherwise update/reconfigure particular node 700 functionality, content and local structure (including access to image/data 20 collection and decisioning functionality). For example, the tool 508 can be used facilitate all major administrative functions used for the day-to-day running of the network system 10 as well as the standard search facilities accessed through the host system 14 used by customers (e.g. DS 9 and members 29) of the network system 10 to access stored items and images in the database 22. The administrative functions can include functions such as but not limited to management of the hierarchy 702 and the associated users, roles, permissions, distribution settings and contact information, available to the individual users of the DS 9, as well as search criteria input, results and image viewing, item results distribution, and the decisioning 814 and settlement 110 process configuration available to respective users of the DS 9. The scope of visibility/influence for the user of a particular DS 9 depends upon the attachment point (e.g. A, B, C) of the DS 9 to the member node hierarchy 702, e.g. through implementation via sign-on privileges that facilitates connection of the user session of the DS 9 to the predefined node 700 of the hierarchy 702. It is recognised that the user of the DS 9 could, based on the degree of permission, see and interact with all pending image/data 20 in the storage 23 of the DMS 12 in respect to their scope of visibility.

For example, referring again to FIG. 7, attachment point A of the DS 9 to the hierarchy 702 could allow the user to review/interact with all image/data 20 collected from the "parent" node B and the associated "child" nodes C and D, based on the modules 150 available to that user. In this example, the user through attachment point B could be able to review/interact with image/data 20 of the nodes C, D, while would be restricted from viewing or otherwise amending the image/data 20 of Nodes E and F. It is recognised that the hierarchy 702 is structured as a flexible architecture whereby nodes 700 can be added, deleted, updated, reviewed, and reattached to other hierarchy 702 points, as provided for or otherwise permission(s) (for module(s) 150 access) associated with the attachment point (e.g. A) of the DS 9.

In general, one embodiment of the hierarchy 702 can operate using rules governing image/data 20 collection/processing as follows:

all image/data 20 collected/processed for a particular member node 700 also applies to it's parent members;

it may not be possible to stop image/data 20 collection/processing information from applying to the image/data 20 originated from the child/parent member nodes 700;

child nodes 700 can have interaction 840 between one another for shared image/data 20 (e.g. image/data 20 collected by C can be reviewed/processed by D or vice versa); and users may not be not allowed to override the image/data 20 collection/processing inherited at their member node 700 or respective child member node(s) 700.

Referring again to FIG. 7, ownership of the image/data 20 (e.g. within the database 22) is associated with the node 700 of the hierarchy 702 to which the image/data 20 was collected from and or processed by. This ownership of the image/data 20 via the hierarchy 702 is used to facilitate the logging/auditing processes of the DMS 12, as described above.

In another of its aspects, an image of an item is identifiable at any node selected from the group consisting of a predetermined node at which the image was captured and a node within the scope of visibility for the predetermined node.

Therefore, the system 10 provides for a scope of visibility, which is available to the user, who is logged on at a particular node 700. The "scope of visibility" in this context refers to all nodes depending (directly or indirectly) from a particular node 700. The system 10 also provides for various functions (of the modules 150), which the user can perform with respect to image/data 20 of the nodes 700 within the user's scope of visibility. It can be seen, therefore, that the system 10 can provide for a high degree of flexibility and control. For example, an image of a document 18 (e.g., a check) may be captured at any particular geographic location. The image, however, may be identified as being related to any node 700, which is within the user's scope of visibility. In this way, central processing of checks, and attribution of the checks to the appropriate node 700 as required, is facilitated. In this manner, access to the image/data 20 collected from various DS 9 in the assembly 16 can be monitored (e.g. logged) and controlled (e.g. allowed module 150 functionality).

Distributed Decisioning Environment 501

Referring to FIGS. 5 and 6, the decisioning process 812 and the settlement process 110 are show in general with respect to example decisioning criteria 814, further explained below. The network system 10 includes configurable engines 24, 502 for facilitating a centralized management of member-specific decisioning information (using decisioning criteria 814) in a configurable distributed decisioning environment 501. The distributed decisioning environment 501 is used by the network system 10 for the purpose of determining which payment (represented by the image/data 20,21) should be such as but not limited to; stopped 818, submitted to ACH for electronic processing 816, or handled as a paper item processing 820. The decisioning system environment 501 can be configured and maintained through a decisioning service or decisioning administration tool 508 (see FIG. 4). The decisioning criteria 814 (including degree of distribution) are configured by the decisioning administration tool 508 and the downloaded to the DMS 12 for use in configuring the local client decisioning engine 502. Accordingly, it is recognised that the DMS 12 can have a subset of the central decisioning information, represented as decisioning criteria 814. In general, the host system 14 provides a mechanism for importing decisioning information (decisioning criteria 814) and keeping the remote decisioning of the DMS 12 up-to-date.

The distributed decisioning environment 501 utilizes a comprehensive set of decisioning filters 500, 504 (see FIG. 5) capable of providing item-by-item, for example, decisioning and transaction 26 routing. Regardless of the type of documents 18 collected for payment by the DMS 12 (e.g. personal, corporate, money order, coupon, etc. . . . ), the distributed decisioning environment 501 will process the image/data 21 associated with the documents 18 (as well as the documents 18 themselves in the case where a capture of the image/data 20 is not permitted) based on how the distributed decisioning environment 501 is configured. As a result of its flexibility, the distributed decisioning environment 501 can be configured for at least some local item decisioning at the DMS 12 on behalf of the DSs 9, central item decisioning at the Host system 14, or a combination of both. It is recognised that the DMS 12 side decisioning is implemented through the modules 150 via the decisioning engine 502. Further, it is recognised that the modules 150 and the decisioning engine 502 can be configured other than as shown. For example, each module 150 can have an incorporated portion of the decisioning filters 504 relevant to the functionality of the respective module 150.

Based on the pre-defined decisioning filters 500,504 (e.g. implemented by decisioning criteria 814 of Rules, Biller Stops, Check Writer ACH Opt-outs, MICR line Blocks and Bank ACHables) established for the distributed decisioning environment 501 by the decisioning admin tool 508, each document 18 is decisioned and thus routed to the most appropriate member 29 endpoint for use by the settlement process 110 in selecting settlement paths 28 such as but not limited to ACH or Image Replacement Document (IRD). For example, the distributed decisioning environment 501 can assume that all items (e.g. collected image/data 20) will be processed as ACH items. For items that are not eligible for ACH processing, such as but not limited to Corporate checks, money orders or consumer Opt-Outs, for example, the distributed decisioning environment 501 can decision items for processing as either Original Paper Deposits (OPD) where the user will be instructed to deposit the items at the bank, or Reproduced Paper (RP) where the items will automatically be routed for processing as IRDs, for example. Items that are configured through the distributed decisioning environment 501 as "STOPS" cannot be processed either by host system 14 nor by one of the members 29 (e.g. a bank). In the case of a "stop" decision by the DMS 12, the respective DS 9 would be so informed.

It is recognised that the distributed decisioning environment 501 can be provided as a subscription service for the respective DMS 12 that are part of the network system 10. For example, this subscription service can be administered through the admin tool 508 and initiated by assigning a subscribing organization (e.g. the members 29 and their associated DMS 12) a System Operator role with the appropriate permissions to configure the distributed decisioning environment 501 through the admin tool 508. Accordingly, the System Operator would be responsible for the configuration set-up of the distributed decisioning environment 501, including set-up of the decisioning criteria 814.

Referring to FIG. 12*a,b,c*, further details of the example decisions for the image/data 21 resulting from the decisioning process 814 (see FIG. 6) and the settlement paths 28 resulting from the settlement process 110 are given. It is recognised that the network system 10 can support DMS 12 and/or host system 14 decisioning operations on a per transaction (e.g. image/data 21) and/or group transaction basis. The decisioning process 814 can be defined as the routing of payments between the transaction starting point (e.g. the DS 9) and the settlement endpoints 28. Referring to FIG. 12*a*, example settlement path endpoints 28 are shown to include stop, paper deposit, IRD, and ACH. Referring to FIG. 12*b*, example filter types 822 for the filters 500,504 (see FIG. 5) along with their example associated functions 824 in the distributed decisioning environment 501 are given. It is recognised that sub-filter modules, as desired, can implement the associated functions 824.

Referring to FIG. 12*c*, the table identifies example configurations of settlement endpoints 28 with respect to the decisioning filter types 822 that the distributed decisioning environment 501 supports, including example distribution 826 of the decisioning filters 500,504 at the DMS 12 and host system 14 to effect the distributed decisioning environment 501. It is recognised that, for example, any of the respective filter types 822 can be implemented at both the DMS 12 and the host system 14. For example, the local decisioning engine 502, when configured by the decisioning criteria 814 supplied by the admin tool 508, can apply the stop filter type that provides a result of eligible for submission to ACH for electronic processing 816 (see FIG. 6). However, a subsequent corresponding stop filter type applied by the host system 14 decisioning engine 24 (once the resultant image/data 21 is sent to the host system 14 for coordination of insertion to the database 22) can result in an override of the engine 502 decision, which provides a stopped 818 decision as a settlement path 28 for the image/data 20.

DMS 12 Decisioning

The DMS 12 for collection of the transaction data (e.g. image/data 20) can be provided in the network system 10 as one or more remote (from the host system 14) DMS 12 responsible for image and transactional data collection, pre-decisioning (on behalf of the DS 9) and forwarding. The basic premise of the DMS 12 is that they facilitate the distributed data capture points (DS 9) of the network system 10 and the DMS 12 are configured to assist in the decisioning process ultimately monitored by the decisioning engine 24 of the host system 14. The DS 9 12 can take on many forms, including such as but not limited to applications for a PC, a browser, a terminal based application, a mobile device, as well as single lane or multi-lane embodiments. The DS 9 and the DMS 12 can connect to the network 11 (e.g. Internet) via the network interface 200 (see FIG. 2*a,b*), e.g. modem, dial-up, for example, as well as FTP and Internet IP based communications (e.g. HTTP).

The DMS 12 can be referred to as a thick client in that the DMS 12 also has decisioning capabilities via the decisioning engine 502 (e.g. pre-decisioning). Configuration of the decisioning engine 502 is coordinated by configuration parameters that are downloaded/uploaded as packages 209 at the DMS 12 with respect to the host system 14. These configuration parameters can be applied via the configuration module 183 of the DMS 12 (e.g. every evening any updates to the configuration parameters are applied to the client decisioning engine 502 and other aspects of DMS 12 configuration).

In general, the DMS 12 can store the majority of content and functionality on the local memory 23 (see FIG. 2*b*) in order to implement part of the distributed decisioning environment 501 (see FIG. 5). An example is part of the decisioning process 812 (see FIG. 6) for the collected image/data 20 can be implemented locally on the DMS 12 without having to wait for potentially delayed interaction with the host system 14 via the network 11 (e.g. reduce the need for accessing the host system 14 through an on-line connection, which normally causes some waiting time). One benefit of the thick DMS 12 is that the collected image/data 20 content can be manipulated locally many times (in interaction with the DSs 9 as the sources of the image/data 20) without having to wait for information from the host system 14 during processing of the collected image/data 20. This is compared to the thin-client configuration of the DS 9, which only displays information about the captured image/data 20 without (e.g. none or otherwise minimal for scanner operation purposes) any local DS 9 on-board decisioning capabilities, e.g. the thin-client system would be an Internet browser that is set to store no information in its cache memory.

Referring again to FIGS. 2*b* and 4, DMS 12 decisioning records (i.e. the configuration data associated with the filters 504 of the decisioning engine 502) can be downloadable via the admin tool 508 (e.g. from the host system 14) the according to DMS 12 configuration settings. For example, DMS 12 can implement the decisioning filters 504 (see FIG. 5) including filter types such as but not limited to: NACHA eligibility rules (e.g. checks only); biller stops; consumer opt-outs; ACH eligibility rules; predefined network system 10 rules (e.g. custom rules provided by members 29); and Federal Reserve Receiver File blocks. For example, based on the above presented filtering types, the user of the DS9 coupled to the DMS 12 can be presented (via the user interface 202—see FIG. 2*a*) with a message (information 19) if a decisioning hit is detected and if a check is the current document 18 or a coupon is the current document 18 and the decisioning endpoint is greater than that of any one of the previous reviews by the filter types resulting in the corresponding transaction 26.

Example Transaction Flow of the DMS 12 Including Decisioning

Pre-decisioning actions taken by the client decisioning engine 502 (on behalf of the DS 9) can include processing such as but not limited to: duplicate items are monitored such that duplicate paper transactions can be identified by same bank, account, and check number as determined by a paper image parsing module (not shown). The DMS 12 can also determine or otherwise pre-process which items belong in which batch files as well as which items belong in which item groups and files (containing a plurality of batches). Accordingly, the client decisioning engine 502 can guide the DMS 12 user though manual, semi-automatic, and/or automated assignment and correction (if necessary) of items into their desired (either user configurable or system imposed or a combination thereof) categories, such as but not limited to item, item group, batch, and file, all of which can be part of the decisioning process to provide for more efficient downstream secondary decisioning at the host system 14. Assignment of the items into their corresponding categories can be done according to criteria such as but not limited to client ID, scanner ID, scanner type, payment type, associated member ID, etc. . . . . . An item can be defined as an image of a paper document plus its related data, either electronically captured or manually entered. A transaction 26 can be defined as a set of one or more items related to a selected payment transaction 26. A batch can be defined as a grouping of one or more transactions 26 processed over a period of time, as well as a grouping of one or more items.

For example, the DMS 12 can supports single ("key now") and batch ("key later") modes for each of the supported scanners 16, coupled to the DS 9, and example transaction profiles (such as but not limited to check only, singles, multiples). It is recognised that as the documents 18 are scanned at the DS 9, the corresponding image/data 20 is submitted over he network 11 to the DMS 12 for initial decisioning via the decisioning engine 502. The results of the decisioning are communicated back to the DS 9, e.g. via information 19, which can represent confirmation of image/data 20 as acceptably received or can represent the requirement for further data entry by the DS 9 for missing/incorrect data in the image/data 20 (subsequently submitted to the DMS 12 for reconsideration).

In view of the above, it is recognised that the workflow of the DMS 12, as configured by example only, demonstrates the interactive nature of the local decisioning process by the engine 502, with each of the modules 150, as part of the complete capturing process of the image/data representative of the document 18. A further example of the interaction between the decisioning of the local engine 502 of the DMS 12 and the DS 9, in view of the entire distributed decisioning environment 501, is shown below consisting of the steps (also showing interaction between engine 502 of the DMS 12 and the user interface 202 of the DS 9:

step a) Capture front image and code line data of the document 18 by the DS 9;

step b) If errors are detected in the codeline by the DMS 12 (or optionally by the scanner 16 software) the check 18 will be automatically rejected or the cashier will be prompted (e.g. by the engine 502) to correct it via a pop-up dialog box (configurable) on the user interface 202 of the DS 9 as provided by the information 19;

step c) The raw codeline will be displayed on the user interface 202 of the DS 9;

step d) rejected characters (e.g. by the engine 502) will be highlighted for re-keying on the user interface 202 of the DS 9 as provided by the information 19;

step e) If bank number on the codeline fails the ABA check digit algorithm (9 digit) by the DMS 12, the check 18 will be automatically rejected or the cashier will be prompted (e.g. by the engine 502) to correct it via a pop-up dialog box (configurable) on the user interface 202 of the DS 9 as provided by the information 19;

step f) If check 18 contains an "Aux on-up" filed, then the item shall be considered as a Business Check and either be automatically accepted (e.g. by the engine 502) or prompt (e.g. by the engine 502) the cashier (on the user interface 202 of the DS 9 as provided by the information 19) whether to continue or cancel (configurable);

step g) Scanned item 18 shall be verified by the DMS 12 with a local verification database 23 based on check 18 codeline or transaction data entered into configurable fields on the form;

step h) If there is a record in the database 23 matching (e.g. by the engine 502) the current transaction the user shall be presented on the user interface 202 of the DS 9 (as provided by the information 19) a blocking message and transaction will be rejected;

step i) Enter Check 18 Amount on the DS 9 for checking against maximum threshold value by the DMS 12—where check 18 is rejected (e.g. by the engine 502) if above maximum, user shall be able to specify if the amount field should preserve last entered value to be used as a default in the next transaction, as prompted on the user interface 202 of the DS 9 as provided by the information 19;

step j) Enter User Fields (configurable) on the user interface 202 of the DS 9 as provided/prompted by the information 19;

step k) If an ARC mode, then capture rear image (configurable) by the DS 9, as verified present by the engine 502;

step l) Capture configurable number of associated items by the DS 9;

step m) Print merchant or file receipt (configurable) by the DS 9 as provided by the information 19 from the DMS 12;

step n) Print customer receipt (configurable) by the DS 9 as provided by the information 19 from the DMS 12;

step o) the user may cancel the transaction at any time such that no other batch or application related action may be allowed until the transaction is complete;

step p) the incomplete transaction shall be automatically cancelled due to a timeout after a configured amount of time elapses since the moment it was started by the user; and step q) the accepted image/data 21 is sent by the DMS 12 to the host system 14.

It is recognised by the above example interaction between the DS 9 and the DMS 12 that all image/data 20 obtained from the DS 9 is prompted through applicable steps/forms displayed on the user interface 202 of the DS 9, as coordinated by the respective module(s) 150 of the DMS 12. Further, in the event of a decision rendered by the DMS 12 in response to receipt of the image/data 20, this decision can also be displayed on the user interface 202 of the DS 9, for subsequent review and/or further action by the user.

Example Decisioning Engine 502 Functionality

Referring to FIG. 5, the decisioning engine 24, receives all image/data 21 from the DMS 12 for secondary decisioning and routing processing for assigning to the appropriate settlement destination/path 28 (used by the settlement process 110), such as but not limited to ACH, aft, Image Replacement Document IRD, or image exchange. Further, the creation of paper drafts and image exchange items could also be supported. It is recognised that for image exchange the transaction data and image data (i.e. image/data 21) are only sent though the network system 10, with no physical paper check to follow. It is recognised that the physical form of the image/data 21 can be reproduced upon request from the host system 14. The engine 24 is located at the host system 14, for example, and has the set of decisioning filters 500 capable of providing item-by-item decisioning and transaction 26 routing. The engine 24 is configured to accommodate personal, corporate, money order, or other document images/data for decisioning and routing, for example. The engine 24 can be configured to interact with local decisioning/routing at the client (using the local engine 502 with associated filters 504), can be configured for central decisioning/routing at the host system 14 alone using engine 24 and filters 500, or a combination of both such that the engines 24,502 share decisioning/routing capabilities. Based on the predefined filters 500,504 established or otherwise coordinated by the host system 14 via the admin configuration tool 508, the engines 24,502 can be configured for such as but not limited to: decisioning of items (extraction of the individual items from the batches which are extracted from the files—as given above); for processing as either Original Paper Deposits OPD where the user will be instructed to deposit the items at the bank; and Reproduced Paper RP where the items will be automatically routed for processing as IRDs. Items that are decided as STOPs cannot be processed as transactions 26 by neither the host system 14 nor by the destination 29 (e.g. bank). In any event, it is recognised that the decisioning by the DMS 12 and the host system 14 is done as a result of image/data 20 receipt from the DS 9.

Example Operation of the Decisioning Engine 24

Referring again to FIG. 5, the DMS 12 will receive updates or additions of the local filters 504 from the host system 14 that have been modified by the tool 508 operator. It is recognised that decisioning by the filters 504 can be overridden or otherwise changed by the filters 500 during the portion of the decisioning process 812 (see FIG. 6), such that the ultimate decisioning/routing for channeling the image/data 21 can be controlled by the host system 14. For example, the filters 504 can include such as but not limited to 1 stop, 2 opd, 3 PR, and 4 undecided. Stream 510 can be selected initially by the DMS 12 for sending the image/data 21 to the archive (database 22) only. Similarly, stream 514 can be selected by the engine 502 and then sent to the engine 24 for ultimate decisioning as 1 stop, 2 RP or 3 ACH. Similarly, stream 512 can be directed without change when received by the engine 24. It is recognised that other changes to the streaming can be done by the engine 24 in response to initial received streams 510, 512, 514 as decided by the DMS 12, thus resulting in the assigned settlement paths 28 for use in settlement process 110 for generation of the transactions 26 sent to the members 29. It is recognised that the override capability of the filters 500 of the engine 24 could be based on configuration data providing for selection of the respective settlement path 28 according to a predefined priority of the filter types (e.g. filter STOP, if eligible, takes precedence over filter RP, if eligible, which takes precedence over filter ACH, etc. . . . ).

Further Embodiments Demonstrating Example Interaction Between Engines 24,502

Referring to FIG. 12d, the following example table 830 summarizes example configurations 827 for the distributed decisioning environment 501 of FIG. 5. The table 830 indicates the decisioning filter types 822 as per the decisioning criteria 814, the processing location 830 as either the DMS 12 and/or the host 14, the expected settlement path 28, and example user messages 828 for presentation to the DMS 12 (either directly if decision is local or via indirectly via the network 11 if the decision is on the host 14).

In view of the above, the system operator of the network system 10 configures the host/client system and associated engines 24,502 through the admin tool 508. The filters 500, 504 can be configured by the operator manually/semi-automatically/automatically via the tool 508, filters 500,504 such as but not limited to fiscal/type rules, biller stops, check writer ACH optouts, MICR line blocks and bank ACHables. It is recognised that application of the filters 500,504 by the engines 24,502 can provide for stream selection of the image/data 20,21 as the transactions 26 thus routed to the most appropriate settlement path 28 for processing such as ACH or IRD at the member 29 destination. The filters 504 and associated engine 502 of the DMS 12 are downloaded (e.g. inherited) from the host system 14 according to the configuration of the engine 24, and engine 500, as to the separation of the decisioning criteria between host 14 and DMS 12. Further, ACHable transactions 26 can be further defined as either ARC (Accounts Receivable Check—person not present at time of image/data 20 capture) or POP (point of purchase check—person present at the time of image/data 20 capture).

In view of the above-described network system 10, in one aspect, the network system 10 provides a method of depositing a plurality of checks 18 to a plurality of accounts (e.g. members 29). The method includes, first, inputting account data 20 for each check 18 respectively, and second, capturing an image 20 of each check 18. Next, each image/data 20 is transmitted to a central processor (e.g. DMS 12) for predecisioning through appropriate interaction with the DS 9, after which the predecisioned image/data 21 is submitted to and processed via the host system 14 for deposit to the credit of each member 29 account respectively.

In another aspect, the network system 10 provides a system for enabling one or more users of the DSs 9 to process and collect data 20 pertaining to checks 18. The system 10 can include the hierarchical structure 702 comprising the plurality of nodes 700. The structure 702 is adapted to permit the user of the DS 9 to logon to the DMS 12 at one or more nodes 700 authorized/assigned to the user. Each node 700 is operatively connected in a vertically oriented relationship with one or more other nodes 700 (e.g. child-parent relationships). Upon each user logging into the DMS 12 at an authorized node 700, each user can have a scope of visibility relative to all nodes 700 below the assigned node 700, directly or indirectly connected thereto. In yet another aspect, the nodes 700 can be accessible at preselected geographic locations.

Operation of the Network System 10

Figure 13:
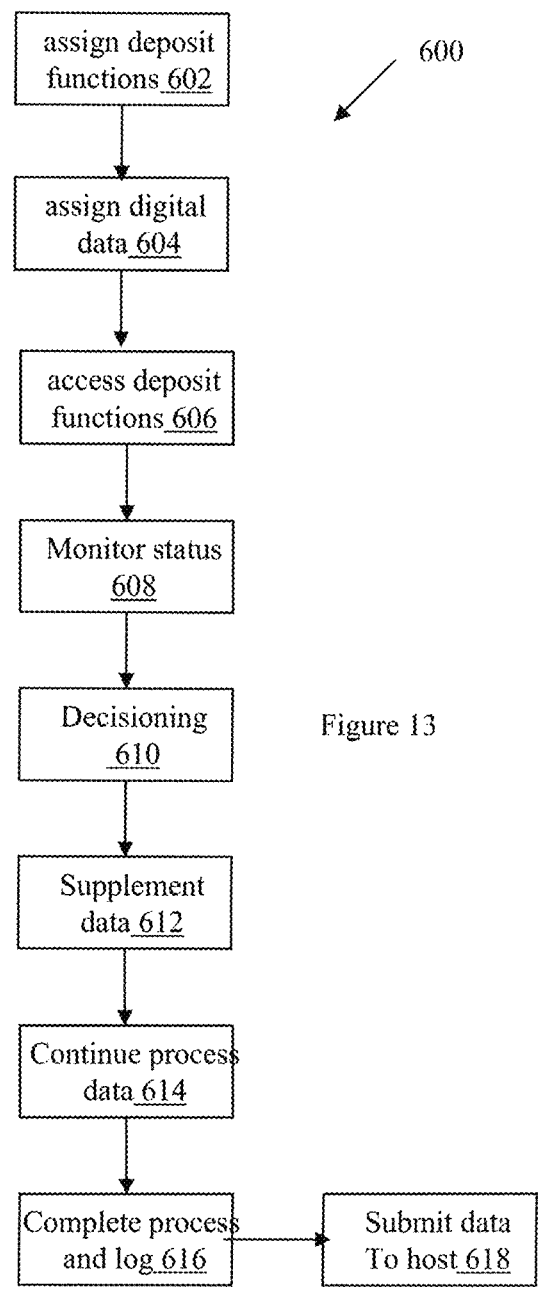
FIG. 13 is an example operation of the system of FIG. 1.

Referring to FIG. 13, shown is an example operation 600 for coordinating collection and processing of digital data by a plurality of deposit modules (of the DMS 12) with respect to a plurality of users over the communications network 11. The digital data (e.g. image/data 20) is based on a plurality of original deposits 18 and includes at least the digital images of the original deposits and respective deposit information. Step 602 includes assigning a list of one or more deposit functions to each respective user (e.g. by the communications modules 185 in conjunction with the workflow module 187), such that the corresponding module 150 of the plurality of deposit modules coordinates each of the deposit functions. Step 604 includes assigning respective digital data portions of the digital data that are associated with each of the assigned deposit modules 150. Step 606 includes providing network access via the network interface 200 (see FIG. 2b) to the assigned deposit functions for the collection and processing of the digital data 20 with one or more users of the plurality of users. The deposit modules 150 includes a first module (e.g. scanner module 160) that monitors receipt of the digital images and respective deposit information of the digital data 20 and includes a second module for implementing on the digital data 20 a second deposit function of the plurality of the deposit functions. Step 608 includes monitoring a flow of the digital data 20 between the first deposit module and the second deposit module based on a completion status of the digital data with respect to the first module. Step 610 includes decisioning of the digital data 20 received by the deposit modules 150 and generating a decision (e.g. information 19 by the decision engine 502) with respect to the decisioning Step 612 includes communicating (e.g. via the communications module 185) the decision 19 back to the user assigned to the respective deposit modules. Step 614 includes receiving data 20 by the DMS 12 from the DS 9 supplemental to the decisioned digital data 20 in response to the decision 19 (e.g. erroneous digital data 20 or digital data 20 is incomplete). Step 614 includes processing the digital data through the relevant other deposit module(s) 150, such as the key data module 165 that provides a key data deposit function of the list of deposit functions, the balancing module 170 that provides batch balancing deposit function of the list of deposit functions, and the approval module 175 that provides a batch approval deposit function of the list of deposit functions. Step 616 includes monitoring an event or an activity with respect to the digital data that is recorded (e.g. information 42) in connection with a user ID of the respective user implementing the event or the activity. Step 618 includes submit the digital data 20 when approved to the host system 14.

Any element in a claim that does not explicitly state "means for" performing a specified function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. A mobile device configured for processing a paper financial document, the mobile device coordinating processing of digital data by interacting with a key data module of a plurality of deposit modules, the digital data including at least a digital image of the paper financial document and respective deposit information, the plurality of deposit modules being on a server in communication with the mobile device over a communications network, the plurality of deposit modules facilitating a distribution of deposit functions for the deposit processing of the digital data, the mobile device comprising:

a user interface for receiving key data for submission to the key data module;

a processor and associated memory having instructions stored thereon for execution by the processor for:

receiving the key data associated with the digital image of the paper financial document;

communicating with the key data module by sending the key data to the key data module as a first module of the plurality of deposit modules on the server in order to continue said processing of the digital data;

communicating with a decisioning module that provides decisioning of the digital data received by the plurality of deposit modules and generates a decision with respect to the decisioning; and receiving an assignment of one or more of the plurality of deposit modules to a respective user of the mobile device via a hierarchical structure, the hierarchical data structure having a plurality of nodes including at least one parent node for a respective user and at least one dependent node assigned to others of one or more users, the hierarchical structure for coordinating the assignment of the one or more deposit functions to the respective user and the others;

wherein the server includes a second module for implementing on the key data a second deposit function of the plurality of the deposit functions.

2. The mobile device of claim 1, wherein the first module is configured to communicate the decision back to the respective user assigned to the first module.

3. The mobile device of claim 2, wherein the decision requires the respective user assigned to the first module to provide data supplemental to the decisioned digital data in response to the decision.

4. The mobile device of claim 3, wherein the decision is selected from the group comprising: the digital data contains erroneous data; and the digital data is incomplete.

5. The mobile device of claim 1, wherein the second module is configured to communicate the decision back to a user assigned to the second module.

6. The mobile device of claim 5, wherein the decision requires the user assigned to the second module to provide data supplemental to the decisioned digital data in response to the decision.

7. The mobile device of claim 6, wherein the decision is selected from the group comprising: the digital data contains erroneous data; and the digital data is incomplete.

8. The mobile device of claim 1, wherein the second deposit module is selected from the group consisting of a balancing module that provides batch balancing deposit function of the list of deposit functions; and an approval module that provides a batch approval deposit function of the list of deposit functions.

9. The mobile device of claim 8, wherein the number of the plurality of deposit modules includes more than the first and second deposit modules.

10. The mobile device of claim 1 further comprising the user interface including a network browser application that provides remote access to the plurality of deposit modules hosted by a network service.

11. The mobile device of claim 10, wherein the network is the Internet and the network service is a Web service.

12. The mobile device of claim 1 further comprising a logging module that monitors an event or an activity with respect to the digital data that is recorded in connection with a user ID of the respective user implementing the event or the activity, the event or the activity associated with at least one of the deposit functions for the digital data.

13. The mobile device of claim 12, wherein the event or activity is associated with an error message pertaining to the deposit function selected from the group comprising: the collection of the digital data; and processing of the digital data.

14. The mobile device of claim 1, wherein the respective user has a scope of access to a plurality of the digital data including digital assigned to the respective user and the digital data assigned to the others.

15. The mobile device of claim 1, wherein the digital data representing the paper financial document is grouped as a batch deposit.

16. The mobile device of claim 15, wherein two or more users of the plurality of users contribute to the digital data contained in the batch deposit.

17. The mobile device of claim 16, wherein only one of the two or more users can access the batch deposit via the one or more deposit functions assigned to the one of the two or more users.

18. The mobile device of claim 17, wherein the one of the two or more users restricts access to the batch deposit for a predefined period of time.

19. The mobile device of claim 1 further comprising an imaging device for converting the paper financial document into the digital image.

20. A method for processing a paper financial document, the method coordinating collection and-processing-of digital data by interacting with a key data module of a plurality of deposit modules, the digital data including at least a digital image of Hail the paper financial document and respective deposit information, the plurality of deposit modules being on a server in communication with a mobile device over a communications network, the plurality of deposit modules facilitating a distribution of deposit functions for deposit processing of the digital data, the method comprising the acts of:

receiving, using a computer processor of the mobile device, key data for submission to the key data module, the key data associated with the digital image of the paper financial document; and sending, using a computer processor of the mobile device, the key data to the key data module as a first module of the plurality of deposit modules on the server in order to continue said processing of the digital data;

communicating, using a computer processor of the mobile device, with a decisioning module that provides decisioning of the digital data received by the plurality of deposit modules and generates a decision with respect to the decisioning; and receiving, using a computer processor of the mobile device, an assignment of one or more of the plurality of deposit modules to a respective user of the mobile device via a hierarchical structure, the hierarchical data structure having a plurality of nodes including at least one parent node for a respective user and at least one dependent node assigned to others of one or more users, the hierarchical structure for coordinating the assignment of the one or more deposit functions to the respective user and the others;

wherein the server includes a second module for implementing on the key data a second deposit function of the plurality of the deposit functions.

21. The method of claim 20 further comprising the act communicating the decision back to the respective user assigned to the first module.

22. The method of claim 21 further comprising the act of receiving data supplemental to the decisioned digital data in response to the decision.

23. The method of claim 22, wherein the decision is selected from the group comprising: the digital data contains erroneous data; and the digital data is incomplete.

24. The method of claim 20 further comprising the act of communicating the decision back to a user assigned to the second module.

25. The method of claim 24 further comprising the act of receiving data supplemental to the decisioned digital data in response to the decision.

26. The method of claim 25, wherein the decision is selected from the group comprising: the digital data contains erroneous data; and the digital data is incomplete.

27. The system of claim 20, wherein the second deposit module is selected from the group consisting of a balancing module that provides batch balancing deposit function of the list of deposit functions and an approval module that provides a batch approval deposit function of the list of deposit functions.

28. The method of claim 27, wherein the number of the plurality of deposit modules includes more than the first and second deposit modules.

29. The method of claim 20, wherein the user interface includes a network browser application that provides remote access to the plurality of deposit modules hosted by a network service.

30. The method of claim 29, wherein the network is the Internet and the network service is a Web service.

31. The method of claim 30 further comprising the act of monitoring an event or an activity with respect to the digital data that is recorded in connection with a user ID of the respective user implementing the event or the activity, the event or the activity associated with at least one of the deposit functions for the digital data.

32. The method of claim 31, wherein the event or activity is associated with an error message pertaining to the deposit function selected from the group comprising: the collection of the digital data; and processing of the digital data.

33. The method of claim 20 further comprising the act of providing the respective user with a scope of access to a plurality of the digital data including the digital data assigned to the respective user and the digital data assigned to the others.

34. The method of claim 20, wherein the digital data representing the paper financial document is grouped as a batch deposit.

35. The method of claim 34 further comprising the act of receiving contributions to the digital data contained in the batch deposit from two or more users of the plurality of users.

36. The method of claim 35, wherein only one of the two or more users can access the batch deposit via the one or more deposit functions assigned to the one of the two or more users.

37. The method of claim 36, wherein the one of the two or more users restricts access to the batch deposit for a predefined period of time.

38. The method of claim 20 further comprising the step of converting the paper financial document into the digital image by an image capture device.

39. A mobile device configured for processing a paper financial document, the mobile device coordinating processing of digital data by interacting with a key data module of a plurality of deposit modules, the digital data including at least a digital image of the paper financial document and respective deposit information, the plurality of deposit modules being on a server in communication with the mobile device over a communications network, the plurality of deposit modules facilitating a distribution of deposit functions for the deposit processing of the digital data, the system comprising:
  a user interface for receiving key data for submission to the key data module;
  a processor and associated memory having instructions stored thereon for execution by the processor to communicate with the key data module by:
  receiving the key data associated with the paper financial document; and
  sending the key data to the key data module as a first module of the plurality of deposit modules on the server in order to continue said processing of the digital data;
  wherein the server includes a second module for implementing on the key data a second deposit function of the plurality of the deposit functions such that the second deposit module is selected from the group consisting of a balancing module that provides batch balancing deposit function of the list of deposit functions and an approval module that provides a batch approval deposit function of the list of deposit functions.

40. The system of claim 39 further comprising a decisioning module that provides decisioning of the digital data received by the deposit modules and generates a decision with respect to the decisioning.

41. The system of claim 39 further comprising a hierarchical structure having a plurality of nodes including at least one parent node for a respective user and at least one dependent node assigned to others of one or more users, the hierarchical structure for coordinating the assignment of the one or more deposit functions to the respective user and the others.

42. The mobile device of claim 39 further comprising an imaging device for converting the paper financial document into the digital image.

43. A method for processing a paper financial document, the method coordinating collection and processing of digital data by interacting with a key data module of a plurality of deposit modules, the digital data including at least a digital image of a paper financial document and respective deposit information, the plurality of deposit modules being on a server in communication with a mobile device over a communications network, the plurality of deposit modules facilitating a distribution of deposit functions for deposit processing of the digital data, the method comprising the acts of:
  receiving, using a computer processor of the mobile device, key data for submission to the key data module, the key data associated with the paper financial document; and
  sending, using a computer processor of the mobile device, the key data to the key data module as a first module of the plurality of deposit modules on the server in order to continue said processing of the digital data;
  wherein the server includes a second module for implementing on the key data a second deposit function of the plurality of the deposit functions such that the second deposit module is selected from the group consisting of a balancing module that provides batch balancing deposit function of the list of deposit functions and an approval module that provides a batch approval deposit function of the list of deposit functions.

44. The method of claim 43 further comprising the act of decisioning of the digital data received by the deposit modules and generating a decision with respect to the decisioning.

45. The method of claim 43 further comprising the act of coordinating the assignment of the deposit modules through a hierarchical structure having a plurality of nodes including at least one parent node for the respective user and at least one dependent node assigned to others of the one or more users, the hierarchical structure for coordinating the assignment of the one or more deposit functions to the respective user and the others.

46. The method of claim 43 further comprising the step of converting the paper financial document into the digital image by an image capture device.

* * * * *